United States Patent
Choi et al.

(10) Patent No.: US 10,574,603 B2
(45) Date of Patent: Feb. 25, 2020

(54) METHOD, ELECTRONIC DEVICE, AND STORAGE MEDIUM FOR PROVIDING SERVICE

(71) Applicant: Samsung Electronics Co., Ltd., Gyeonggi-do (KR)

(72) Inventors: Woo-Jun Choi, Gyeonggi-do (KR); Ju-Seung Lee, Gyeonggi-do (KR); Soon-Hyun Cha, Gyeonggi-do (KR); Sun-Min Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 239 days.

(21) Appl. No.: 15/307,952

(22) PCT Filed: Apr. 30, 2015

(86) PCT No.: PCT/KR2015/004403
§ 371 (c)(1),
(2) Date: Oct. 31, 2016

(87) PCT Pub. No.: WO2015/167283
PCT Pub. Date: Nov. 5, 2015

(65) Prior Publication Data
US 2017/0104704 A1  Apr. 13, 2017

(30) Foreign Application Priority Data
Apr. 30, 2014  (KR) .................... 10-2014-0052947

(51) Int. Cl.
  *H04L 12/58*  (2006.01)
  *H04L 29/08*  (2006.01)
  *H04L 29/06*  (2006.01)

(52) U.S. Cl.
  CPC ............ *H04L 51/046* (2013.01); *H04L 67/24* (2013.01); *H04L 65/1016* (2013.01); *H04L 65/608* (2013.01)

(58) Field of Classification Search
  CPC ....... H04L 51/043; H04L 51/046; H04L 67/24; H04L 65/608; H04L 65/1016
(Continued)

(56) References Cited

U.S. PATENT DOCUMENTS

| 8,695,077 B1 | 4/2014 | Gerhard et al. |
| 2006/0190546 A1* | 8/2006 | Daniell ............... G06Q 10/107 709/206 |

(Continued)

FOREIGN PATENT DOCUMENTS

| JP | 4851516 | 10/2011 |
| WO | WO 2013044649 | 4/2013 |
| WO | WO 2014043274 | 3/2014 |

OTHER PUBLICATIONS

Microsoft, Lync 2013 for Office 365 Quick Reference, 2012, Microsoft Corporation, http://kysu.edu/wp-content/uploads/2013/10/Lync2013Guide.pdf (Year: 2012).*

(Continued)

*Primary Examiner* — Zi Ye
(74) *Attorney, Agent, or Firm* — The Farrell Law Firm, P.C.

(57) ABSTRACT

Disclosed is an electronic device including: a display that displays screens; a processor that displays, on the display of the electronic device, presence information of one or more counterpart devices associated with a first communication service provided through a browser application, receives a user input for communication with the one or more counterpart devices, and displays, on the display, a second screen of the browser application providing a second communication service in response to the user input; a first module including a plurality of modules for providing the first communication service; a second module including a plurality of modules for providing a second communication (Continued)

service; and a control module that controls the first module and the second module.

27 Claims, 9 Drawing Sheets

(58) Field of Classification Search
USPC ........................................................ 709/206
See application file for complete search history.

(56) References Cited

U.S. PATENT DOCUMENTS

| | | | | |
|---|---|---|---|---|
| 2010/0293402 | A1* | 11/2010 | Marinkovic | G06F 1/3218 |
| | | | | 713/320 |
| 2011/0066688 | A1* | 3/2011 | Pinding | H04L 67/24 |
| | | | | 709/206 |
| 2011/0271192 | A1* | 11/2011 | Jones | G06F 3/0421 |
| | | | | 715/727 |
| 2014/0108594 | A1 | 4/2014 | Siegel et al. | |
| 2014/0160225 | A1* | 6/2014 | Baldelli | H04N 7/15 |
| | | | | 348/14.08 |
| 2014/0297879 | A1 | 10/2014 | Gao et al. | |
| 2015/0188950 | A1 | 7/2015 | Astrom et al. | |
| 2015/0244981 | A1* | 8/2015 | Johnson | H04N 7/15 |
| | | | | 348/14.07 |

OTHER PUBLICATIONS

Bylund, From Cinepak to H.265: a brief history of video compression, Dec. 22, 2009, arstechnica.com, https://arstechnica.com/gadgets/2009/12/from-cinepak-to-h265-a-survey-of-video-compression/ (Year: 2009).*

Richardson, Video coding: a historical timeline of standards and formats, Jun. 23, 2014, www.vcodex.com, https://www.vcodex.com/news/video-coding-a-historical-timeline-of-standards-and-formats/ (Year: 2014).*

PCT/ISA/210 Search Report issued on PCT/KR2015/004403 (pp. 3).

PCT/ISA/237 Written Opinion issued on PCT/KR2015/004403 (pp. 9).

\* cited by examiner

[Fig. 1]
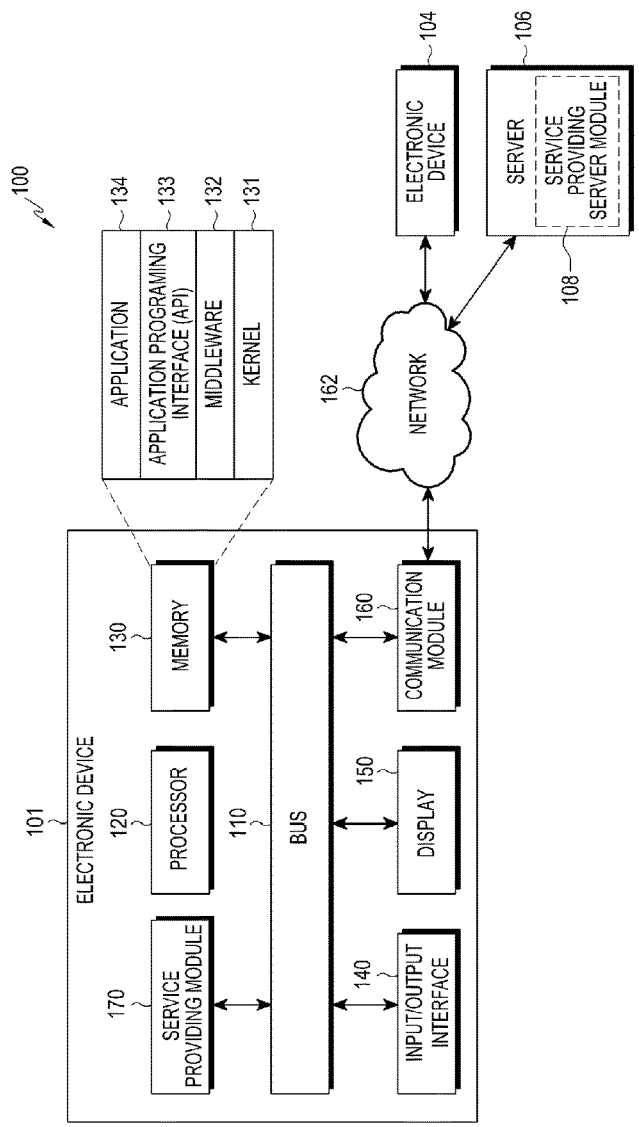
[Fig. 2]
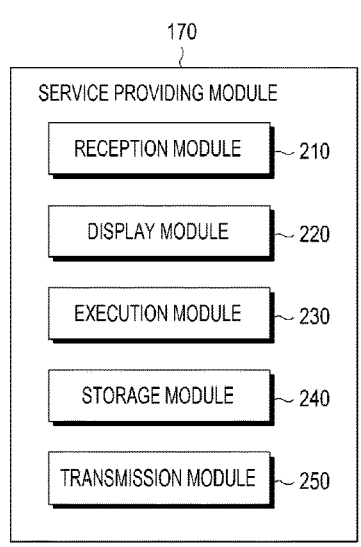

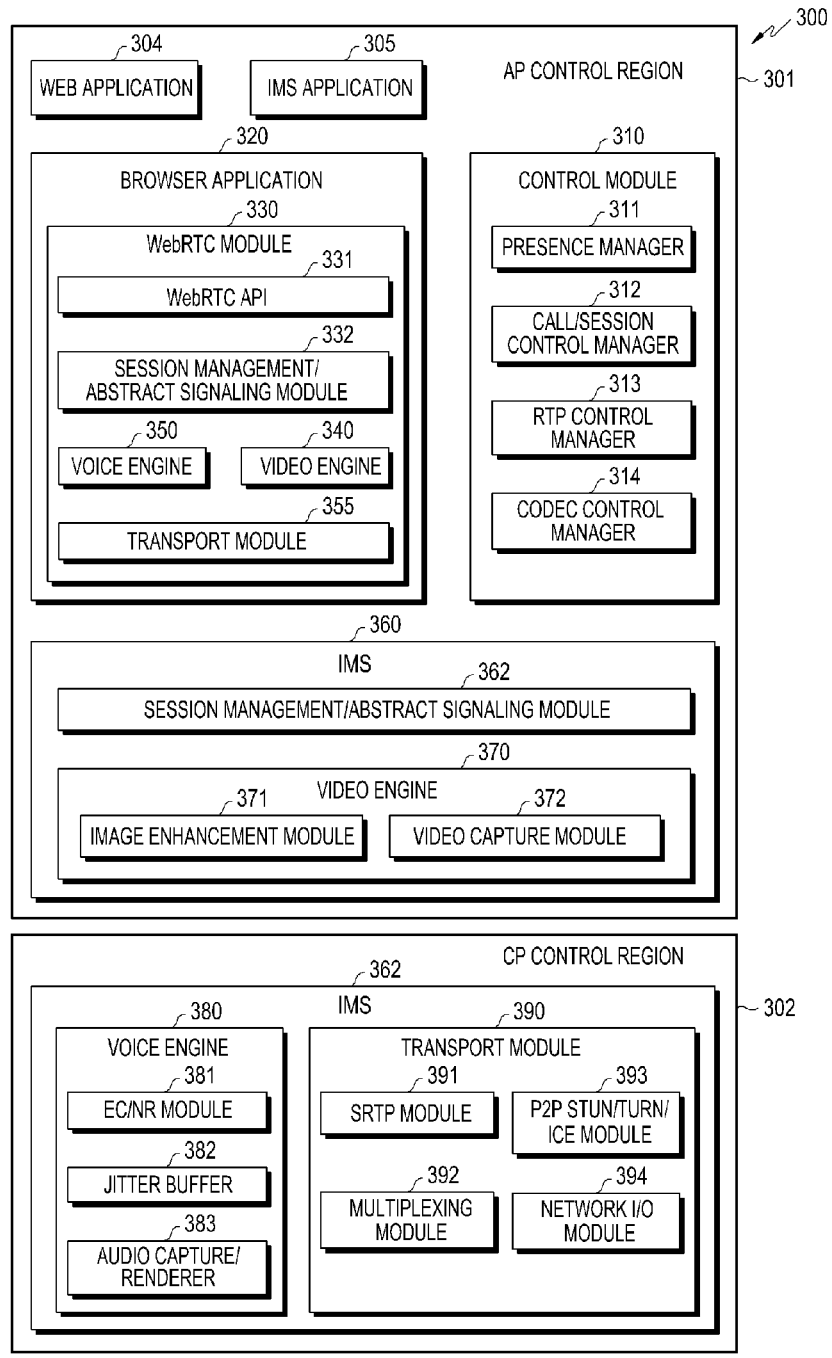
[Fig. 3]

[Fig. 4]
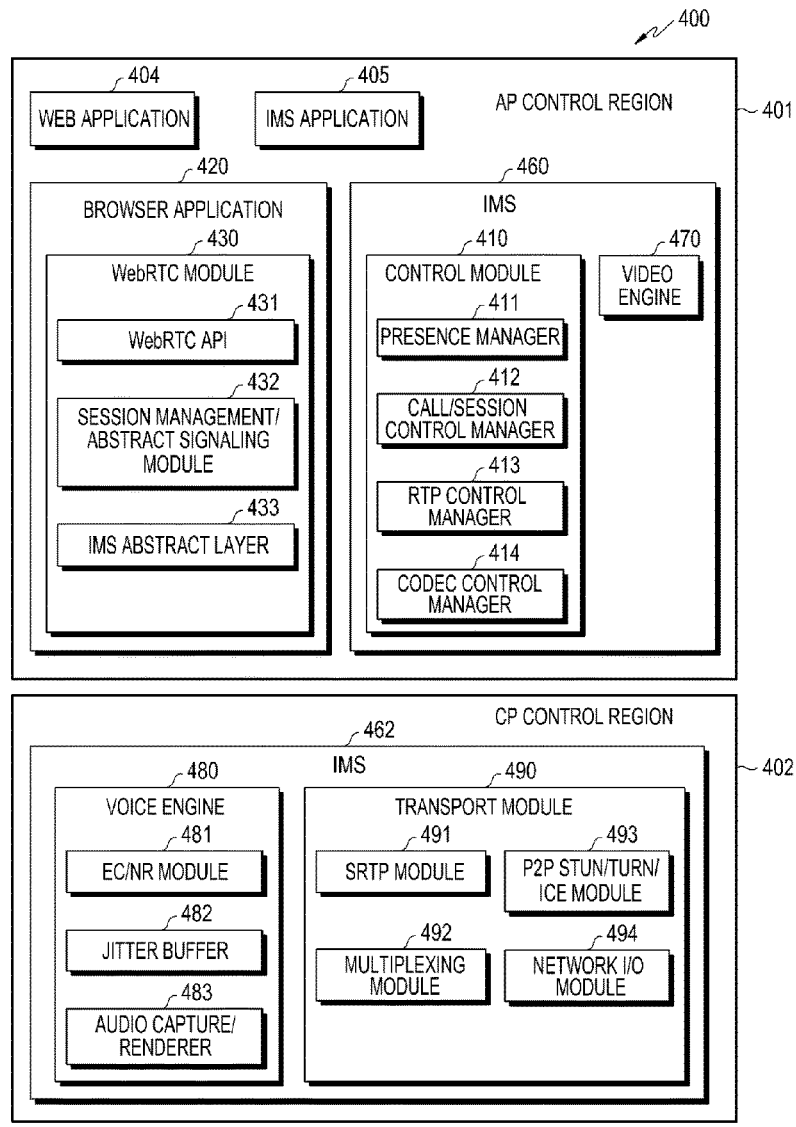
[Fig. 5]
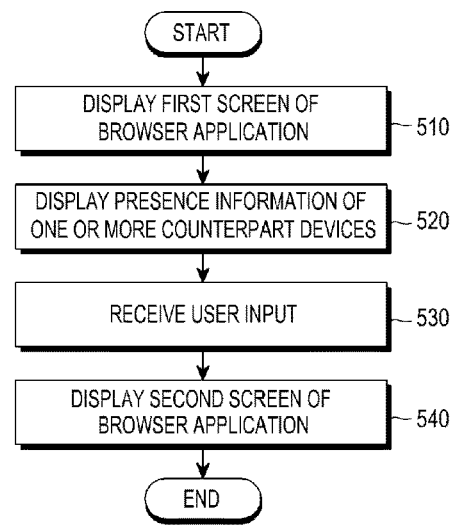

[Fig. 6a]
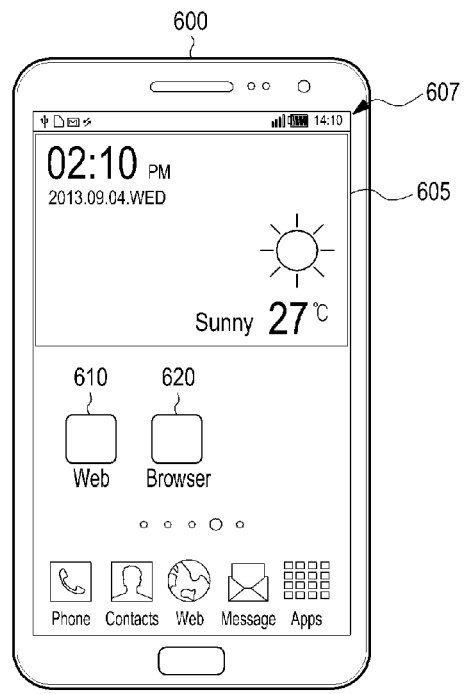
[Fig. 6b]
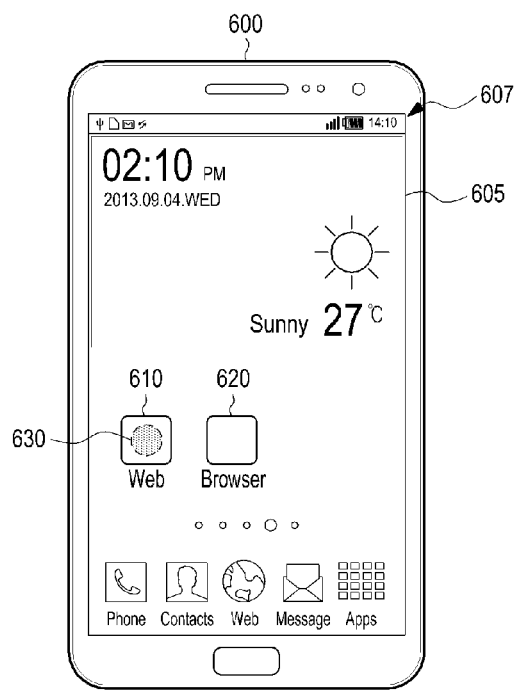

[Fig. 7a]
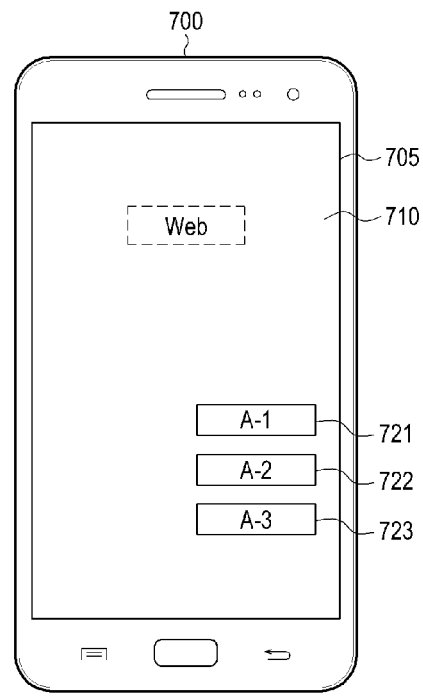
[Fig. 7b]
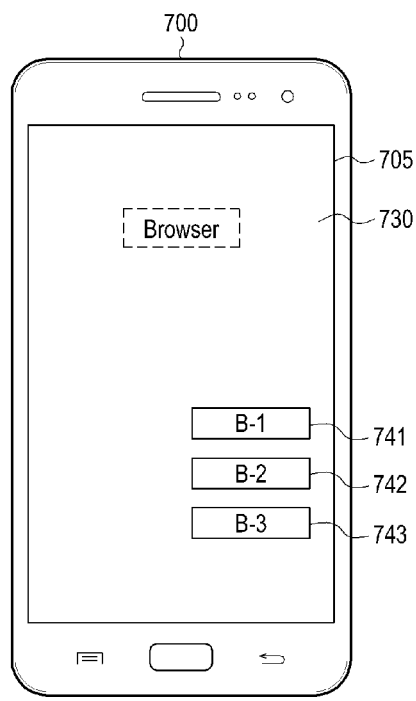

[Fig. 8a]
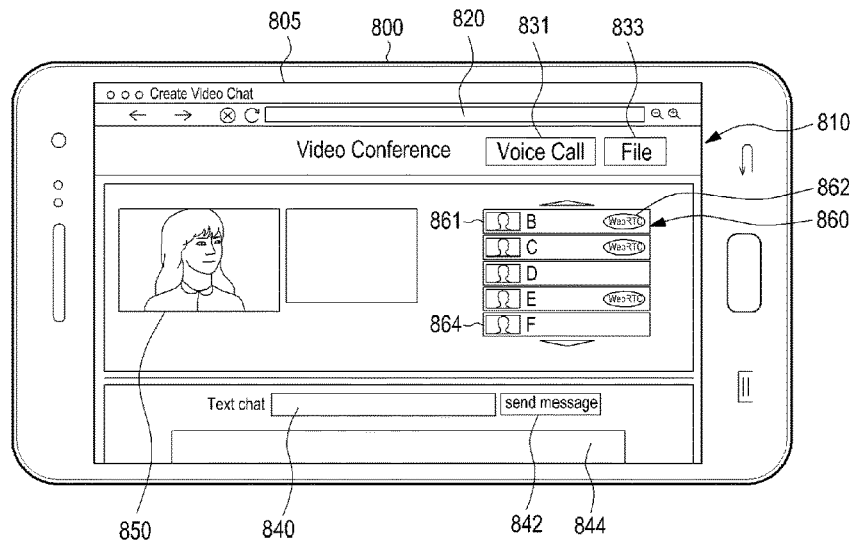
[Fig. 8b]
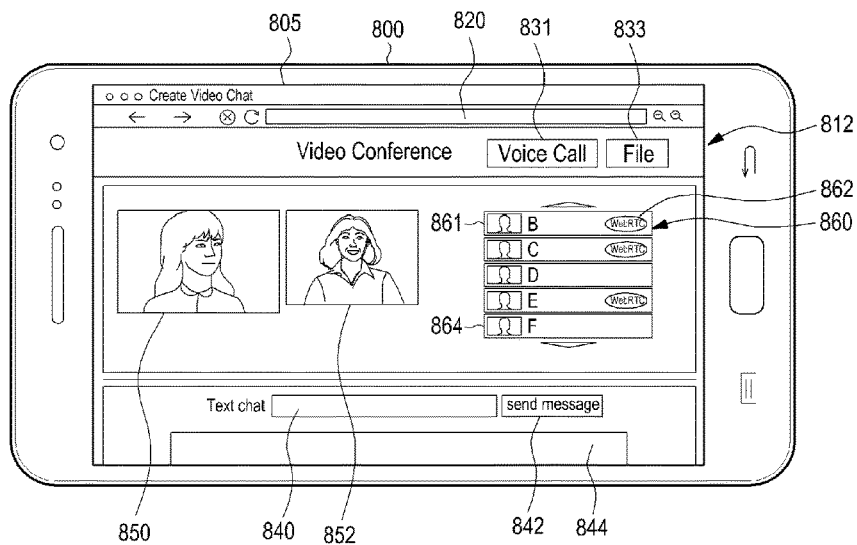
[Fig. 9]
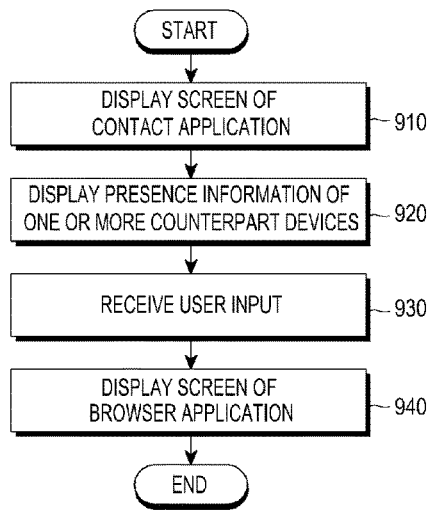

[Fig. 10a]
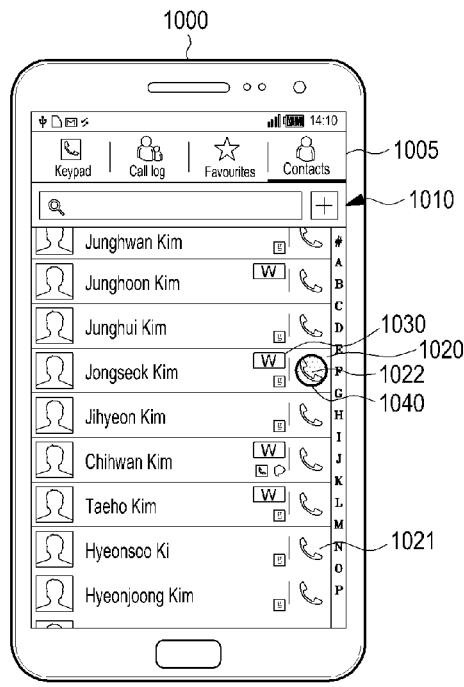
[Fig. 10b]
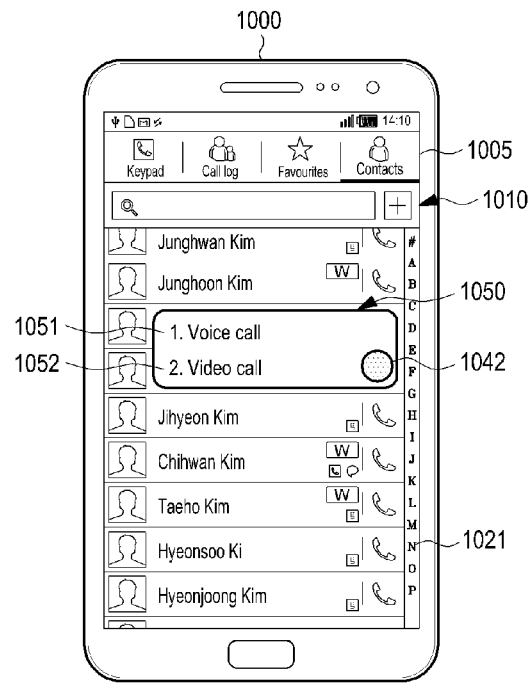

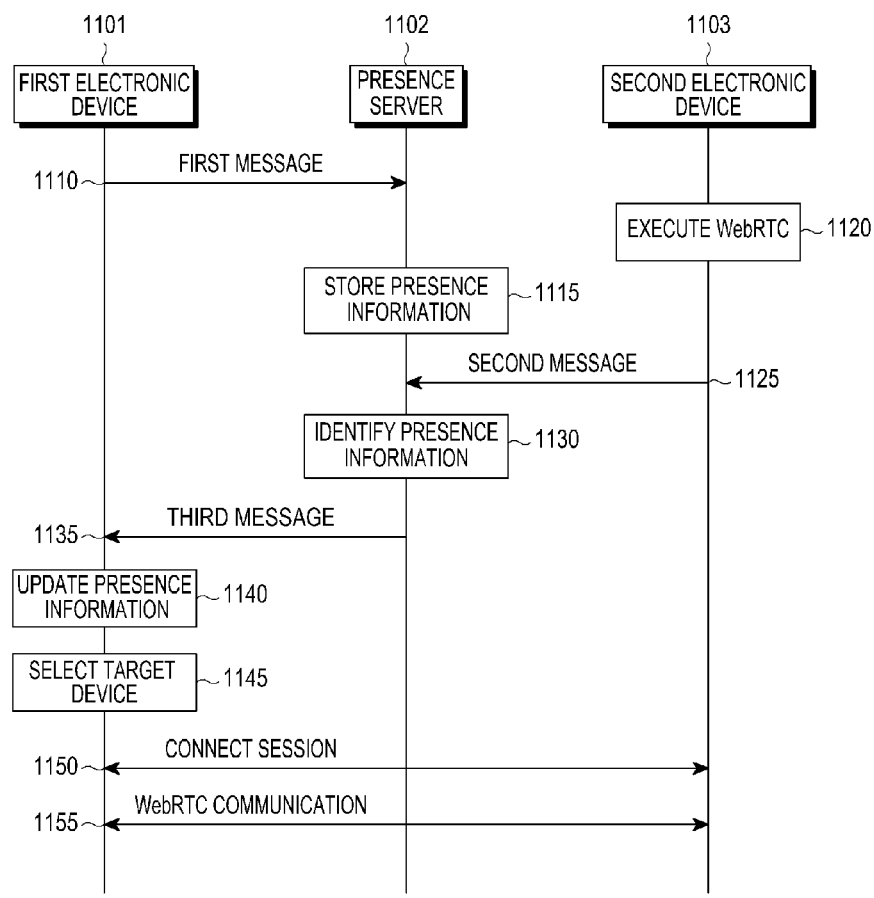
[Fig. 11]

[Fig. 12]
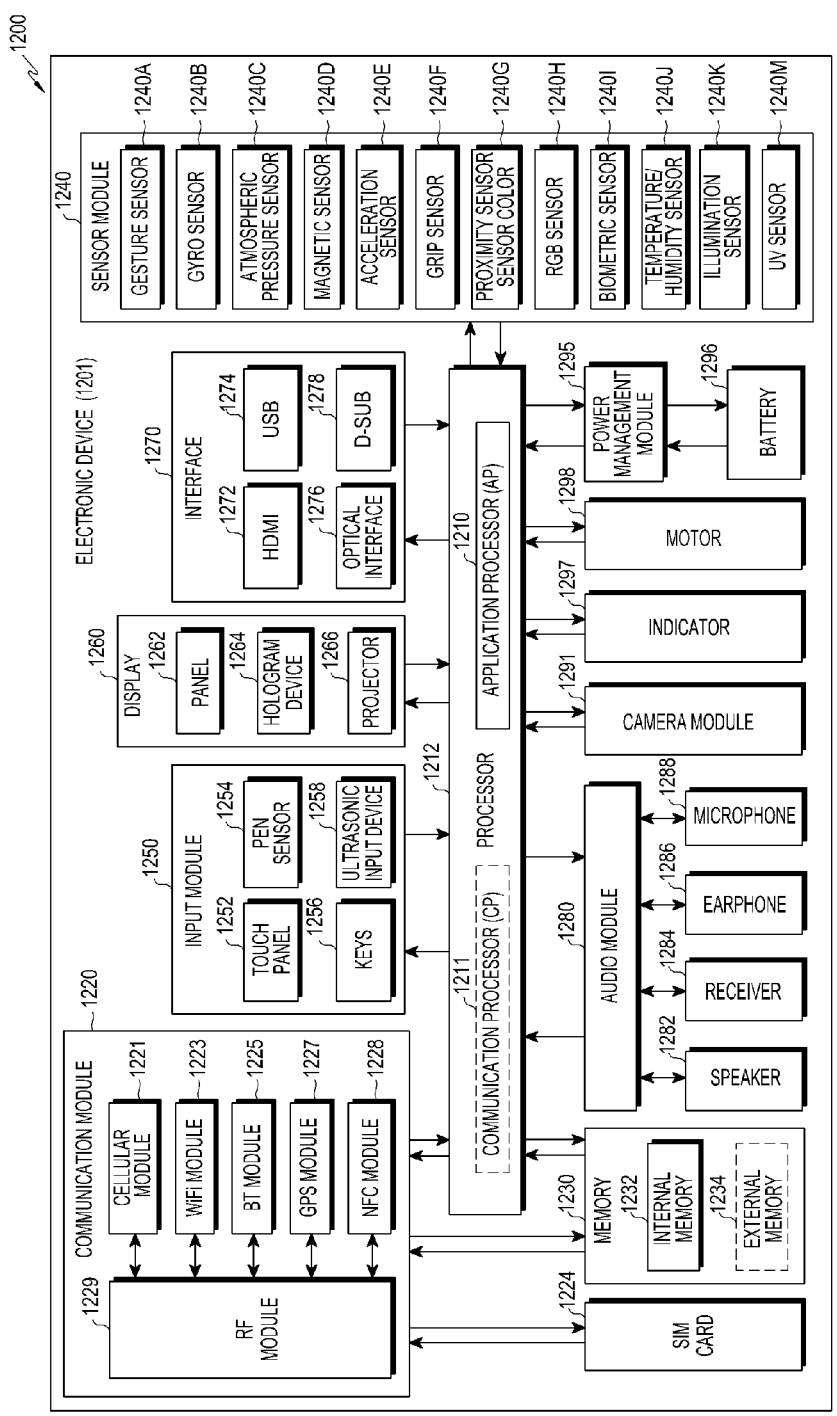

METHOD, ELECTRONIC DEVICE, AND STORAGE MEDIUM FOR PROVIDING SERVICE

PRIORITY

This application is a National Phase Entry of PCT International Application No. PCT/KR2015/004403, which was filed on Apr. 30, 2015, and claims priority to Korean Patent Application No. 10-2014-0052947, which was filed on Apr. 30, 2014, the contents of each of which are incorporated herein by reference.

TECHNICAL FIELD

The present disclosure relates to an electronic device and a method for providing a service.

BACKGROUND ART

Web Real-Time Communication (WebRTC) is a technology that provides voice calls, video chat, Video Telephone (VT or Video Call), video conferencing, and file transfer through browser applications without additional plug-in installation.

An IP Multimedia Subsystem or an IP Multimedia core network Subsystem (IMS) is a technology that is the base of Voice over Long-Term Evolution (VoLTE) and Rich Communication Services (RCS) and provides functions, such as voice all, video call, video chat, video conferencing, Short Message Service (SMS) over IMS, conference call, Instance Message (IM), group chat, file transfer, image/video share, presence and the like.

DISCLOSURE OF INVENTION

Technical Problem

A WebRTC service and an IMS service provide partially equal functions. When the WebRTC service and the IMS service are simultaneously supported in one electronic device, there is no method to interwork the two services currently. Further, since the WebRTC service and the IMS service use overlapping modules, an integrated method is required.

Embodiments of the present disclosure may provide a more convenient service to a user by interworking or combing different services (for example, WebRTC service and IMS service).

Solution to Problem

In accordance with an aspect of the present disclosure, an electronic device is provided. The electronic device includes: a display that displays screens; a processor that displays, on the display of the electronic device, presence information of one or more counterpart devices associated with a first communication service provided through a browser application, receives a user input for communication with the one or more counterpart devices, and displays, on the display, a second screen of the browser application providing a first communication service in response to the user input; a first module including a plurality of modules for providing the first communication service; a second module including a plurality of modules for providing a second communication service; and a control module that controls the first module and the second module.

In accordance with another aspect of the present disclosure, a method of providing a service by an electronic device is provided. The method includes: displaying, on a display of the electronic device, presence information of one or more counterpart devices associated with a communication service provided through a browser application; receiving a user input for communication with the one or more counterpart devices; and displaying a second screen of the browser application providing the communication service in response to the user input.

In accordance with an aspect of the present disclosure, a machine-readable storage medium recording a program for executing the method of providing the service by the electronic device is provided. The method includes: displaying, on a display of the electronic device, presence information of one or more counterpart devices associated with a communication service provided through a browser application; receiving a user input for communication with the one or more counterpart devices; and displaying a second screen of the browser application providing the communication service in response to the user input.

In accordance with an aspect of the present disclosure, an electronic device is provided. The electronic device includes: a display that displays screens; and a processor that displays, on the display of the electronic device, presence information of one or more counterpart devices associated with a communication service provided through a browser application, receives a user input for communication with the one or more counterpart devices, and displays, on the display, a second screen of the browser application providing the communication service in response to the user input.

Advantageous Effects of Invention

According to various embodiments of the present disclosure, it is possible to provide a more convenient service to a user by interworking or combing different services (for example, WebRTC service and IMS service).

BRIEF DESCRIPTION OF DRAWINGS

The above and other aspects, features, and advantages of the present disclosure will be more apparent from the following detailed description taken in conjunction with the accompanying drawings, in which:

FIG. 1 illustrates a network environment including an electronic device according to various embodiments of the present disclosure;

FIG. 2 is a block diagram of a service providing method of an electronic device according to various embodiments of the present disclosure;

FIG. 3 illustrates a module system of an electronic device according to various embodiments of the present disclosure;

FIG. 4 illustrates a module system of an electronic device according to various embodiments of the present disclosure;

FIG. 5 is a flowchart illustrating a service providing method of an electronic device according to various embodiments of the present disclosure;

FIGS. 6a to 8b are views for describing an application operating method of an electronic device according to various embodiments of the present disclosure;

FIG. 9 is a flowchart illustrating a service providing method of an electronic device according to various embodiments of the present disclosure;

FIGS. 10a and 10b are views for describing an application operating method of an electronic device according to various embodiments of the present disclosure;

FIG. 11 is a flowchart illustrating a service providing method of an electronic device according to various embodiments of the present disclosure; and FIG. 12 is a block diagram of an electronic device according to various embodiments of the present disclosure.

MODE FOR THE INVENTION

Hereinafter, various embodiments of the present disclosure will be described with reference to the accompanying drawings. The present disclosure may be modified in various forms and include various embodiments. Although specific examples are illustrated in the drawings and described in the description. However, it should be understood that there is no intent to limit the present disclosure to the particular forms disclosed, but on the contrary, the present disclosure is to cover all modifications, equivalents, and/or alternatives falling within the spirit and scope of the disclosure. In describing the drawings, similar elements are designated by similar reference numerals.

Hereinafter, the terms "include" or "may include", which may be used in various embodiments of the present disclosure, refer to the presence of disclosed functions, operations or elements, and do not restrict the addition of one or more functions, operations or elements. Further, it should be understood that the terms "include" or "have" in various embodiments of the present disclosure refer to the presence of features, numbers, steps, operations, elements or components or a combination thereof, which are described in the specification, and do not rule out the presence or the addition of features, numbers, steps, operations, elements or components or a combination thereof.

The term "or" in various embodiments of the disclosure means the inclusion of at least one or all of the disclosed elements. For example, the expression "A or B" may include A, may include B, or may include both A and B.

The expressions such as "first," "second," or the like used in various embodiments of the present disclosure may modify various component elements in the various embodiments but may not limit corresponding component elements. For example, the above expressions do not limit the sequence and/or importance of the elements. The above expressions may be used merely for the purpose to distinguish a constituent element from other constituent elements. For example, a first user device and a second user device indicate different user devices although both of them are user devices. For example, without departing from the scope of the present disclosure, a first structural element may be named a second structural named. Similarly, the second structural element also may be named the first structural element.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms used in various embodiments of the present disclosure are merely used to exemplify a certain embodiment and should not limit various embodiments of the present disclosure. Singular forms are intended to include plural forms unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Electronic devices according to various embodiments of the present disclosure may be devices adopting a communication function. For example, the electronic devices may include at least one of smart phones, tablet personal computers (PCs), mobile phones, video phones, e-book readers, desktop PCs, laptop PCs, netbook computers, personal digital assistants (PDAs), portable multimedia players (PMPs), MP3 players, mobile medical devices, cameras, wearable devices (e.g., head-mounted-devices (HMDs) such as electronic glasses), electronic clothes, electronic bracelets, electronic necklaces, electronic appcessories, electronic tattoos, or smart watches.

According to another embodiment, the electronic devices may be smart home appliances adopting a communication function. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (for example, Samsung HomeSync™, Apple TV™, or Google TV™), a game console, an electronic dictionary, an electronic key, a camcorder, and an electronic picture frame.

According to another embodiment, the electronic devices may include at least one of various medical devices (e.g., a magnetic resonance angiography (MRA), a magnetic resonance imaging (MRI), a computed tomography (CT) machine, and an ultrasonic machine), navigation devices, global positioning system (GPS) receivers, event data recorders (EDR), flight data recorders (FDR), vehicle infotainment devices, electronic devices for ships (e.g., navigation devices for ships, and gyro-compasses), avionics, security devices, automotive head units, robots for home or industry, automatic teller's machines (ATMs) in banks, or point of sales (POS) in shops.

According to another embodiment, the electronic devices may include at least one of furniture or a part of a building/structure having a communication function, electronic boards, electronic signature receiving devices, projectors, or various measuring equipment (e.g., equipment for a water supply, an electricity, gases or radio waves). Electronic devices according to various embodiments of the present disclosure may be one or more combinations of the above-described devices. In addition, electronic devices according to various embodiments of the present disclosure may be flexible devices. Further, it is obvious to those skilled in the art that electronic devices according to various embodiments of the present disclosure are not limited to the above-described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) that uses an electronic device.

FIG. 1 illustrates a network environment 100 including an electronic device 101 according to various embodiments of the present disclosure. Referring to FIG. 1, the electronic device 101 may include a bus 110, a processor 120, a memory 130, an input/output interface 140, a display 150, a communication interface 160, and a service providing module 170.

The bus 110 may be a circuit to connect the above-described components with each other and to transfer communication (for example, control messages) between the above-described components.

For example, the processor 120 may receive instructions, through the bus 110, from the aforementioned other components (for example, the memory 130, the input/output interface 140, the display 150, the communication interface 160, and the service providing module 170), decipher the received instructions, and perform calculation or data processing according to the deciphered instructions.

The memory 130 may store instructions or data received from the processor 120 or other components (for example, at least one of the input/output interface 140, the display 150, the communication interface 160 and the service providing module 170) or generated by the processor 120 or other components. The memory 130 may include programming modules such as, for example, a kernel 131, a middleware 132, an application programming interface (API) 133, or an application 134. Each of the programming modules described above may be configured by software, firmware, hardware, or a combination of two or more thereof.

The kernel 131 may control or manage system resources (for example, at least one of the bus 110, the processor 120, the memory 130 and the like) which are used for performing operations or functions implemented by other programming modules, for example, the middleware 132, the API 133 or the applications 134. Further, the kernel 131 may provide an interface through which the middleware 132, the API 133, and the applications 134 may access individual components of the electronic device 101 to control or manage them.

The middleware 132 may serve as an intermediary such that the API 133 or the application 134 communicates with the kernel 131 to transmit/receive data. Further, in relation to requests for operation received from the application 134, the middleware 132 may control (for example, scheduling or load-balancing) the operation requests by using, for example, a method of determining sequence for using system resources (for example, the bus 110, the processor 120, the memory 130 and/or the like) of the electronic device 101 with respect to at least one application among the applications 134.

The API 133 is an interface by which the application 134 controls a function provided from the kernel 131 or the middleware 132, and may include, for example, at least one interface or function (for example, instructions) for file control, window control, image processing, or text control.

According to various embodiment, the application 134 may include at least one of a Short Message Service (SMS)/Multimedia Messaging Service (MSS) application, an email application, a calendar application, an alarm application, a health care application (for example, application for measuring at least one of exercise amounts and blood sugar), an environmental information application (for example, application providing information on at least one of air pressure, humidity, temperature and/or the like). Additionally or alternatively, the applications 134 may be applications related to information exchange between the electronic device 101 and an external electronic device (for example, an electronic device 104). The application related to the information exchange may include, for example, a notification relay application for transferring specific information to the external electronic device or a device management application for managing the external electronic device.

For example, the notification relay application may include a function of transferring notification information generated in other applications (for example, the SMS/MMS application, the e-mail application, the health care application, or the environmental information application) of the electronic device 101 to external electronic device (for example, the electronic device 104). Additionally or alternatively, the notification relay application may receive notification information from, for example, external electronic device (for example, the electronic device 104) and provide the same to a user. The device management application may manage (for example, at least one of installation, deletion, or updating), for example, at least some functions (for example, turning external electronic device (or some elements) on or off, or adjusting the brightness (or resolution) of a display) of an external electronic device (for example, the electronic device 104) that communicates with the electronic device 101, applications performed in the external electronic device, or services (for example, a call service or a message service) provided in the external electronic device.

According to various embodiments, the application 134 may include applications, which are designated according to attributes (for example, the type of electronic device) of the external electronic device (for example, the electronic device 104). For example, in a case where the external electronic device is an MP3 player, the application 134 may include an application related to the reproduction of music. Similarly, in a case where the external electronic device is a mobile medical appliance, the application 134 may include an application related to health care. According to an embodiment, the application 134 may include at least one of an application designated to the electronic device 101 and an application received from the external electronic device (for example, a server 106 or the electronic device 104).

The input/output interface 140 may transmit an instruction or data input by the user through an input/output device (for example, at least one of a sensor, a keyboard, and a touch screen) to at least one of the processor 120, the memory 130, the communication interface 160, and the service providing module 170 through, for example, the bus 110. For example, the input/output interface 140 may provide data on a user's touch input through a touch screen to the processor 120. The input/output interface 140 may output an instruction or data received from at least one of the bus 110, from the processor 120, the memory 130, the communication interface 160, and the display control module 170 through the input/output device (for example, at least one of a speaker and a display). For example, the input/output interface 140 may output voice data processed by the processor 120 to the user through a speaker.

The display 150 may display various pieces of information (for example, at least one of multimedia data and text data) for the user.

The communication interface 160 may perform a communication connection between the electronic device 101 and the external electronic device (for example, the electronic device 104 or the server 106). For example, the communication interface 160 may be connected to a network 162 through wireless communication or wired communication to communicate with the external electronic device. The wireless communication may include at least one of Wi-Fi, Wi-Fi Direct, Bluetooth (BT), Near Field Communication (NFC), a Global Positioning System (GPS), or cellular communication (for example, LTE, LTE-A, CDMA, WCDMA, UMTS, WiBro, or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a communication network. The communication network may include at least one of a computer network, the Internet, the Internet of things, and a telephone network. According to an embodiment, a protocol (a transport layer protocol, a data link layer protocol, or a physical layer protocol) for communication between the electronic device 101 and external electronic devices may be supported by at least one of the applications 134, the API 133, the middleware 132, the kernel 131, and the communication interface 160.

According to an embodiment, the service providing module 170 may support driving of the electronic device 101 by performing at least one of the operations (or functions) which the electronic device 101 performs. For example, the server 106 may include a service providing server module 108 capable of supporting an application executing module 170 implemented by the electronic device 101. For example, the service providing server module 108 includes one or more components of the service providing module 170 and may perform (on behalf of the service providing module 170) at least one of operations of the service providing module 170.

The service providing module 170 may process at least some of the information obtained from other components (for example, at least one of the processor 120, the memory 130, the input/output interface 140, and the communication interface 160) and utilize the same in various manners. For example, the service providing module 170 may control at least some functions of the electronic device 101 by using the processor 120 or independently therefrom so that the electronic device 101 may interwork with other electronic devices (for example, the electronic device 104 or the server 106). The service providing module 170 may be integrated into the processor 120. According to an embodiment, at least one component of the service providing module 170 may be included in the server 106 (for example, the service providing server module 108) and receive supporting of at least one operation implemented by the service providing module 170 from the server 106. Additional information on the service providing module 170 is provided through FIG. 2 described below.

FIG. 2 is a block diagram 200 of the service providing module 170 of the electronic device (for example, electronic device 101) according to various embodiments of the present disclosure. Referring to FIG. 2, the service providing module 170 may include a reception module 210, a display module 220, an execution module 230, a storage module 240, and a transmission module 250.

The reception module 210 according to various embodiments of the present disclosure may receive at least one of a user input, notification and the like. The reception module 210 may receive notification including a user input for communicating with at least one counterpart device, a user input for executing an application (for example, at least one of a browser application, a contact application, a web application, an IMS application and the like), and information on the presence (hereinafter, referred to as "presence information") of at least one counterpart device. The reception module 210 may receive a user input on at least a part of the display (for example, the display 150) of the electronic device or a user input on another part adjacent to the part. The presence information may include at least one of a current position of the user, available connection information of the user, session information (for example, at least one of a session ID, user preferences, a supported format and the like), state information (for example, execution, termination, online, offline or the like) of an IMS application (or IMS service), state information (for example, execution, termination, online, offline or the like) of a web application or a WebRTC application (or WebRTC service).

The display module 220 according to various embodiments of the present disclosure may display at least one of presence information of at least one counterpart device and an application screen (for example, at least one of a browser application, a contact application, a web application, IMS application and the like) by controlling the display.

In an embodiment, the display module 220 may display presence information of at least one counterpart device related to a communication service provided through the browser application on the display. The reception module 210 may receive a second user input for communication with at least one counterpart device. The display module 220 may display a second screen of the browser application, which provides the communication service, on the display in response to the second user input. The presence information may indicate whether at least one counterpart device is executing the communication service provided through a browser application of at least one counterpart device. Alternatively, the presence information may indicate whether at least one counterpart device is executing an application (for example, a web application 304) of at least one counterpart device providing the communication service. The communication service may be at least one of a voice call, a video call, a video chat, video conferencing, file transfer and the like. The second screen of the browser application may include a first video screen showing a first video photographed by the electronic device and a second video screen showing a second video photographed by at least one counterpart device.

The execution module 230 according to various embodiments of the present disclosure may execute an application (for example, at least one of a browser application, a contact application, web application, an IMS application, a voice call application, a video call application, a video chatting application, an IMS-based SMS application, a conference call application, an IM application, a group chatting application, a file transfer application, an image/video sharing application and the like) and/or a service (for example, at least one of a browser service, a contact service, a WebRTC service, an IMS service, a voice call service, a video call service, a video chatting service, an IMS-based SMS service, a conference call service, an IM service, a group chatting service, a file transfer service, an image/video sharing service and the like).

In an embodiment, the reception module 210 may receive a third user input for executing the browser application. The execution module 230 may execute the browser application in response to the third user input. The display module 220 may display the first screen of the browser application on the display according to the execution of the browser application. The display module 220 may display presence information of at least one counterpart device related to the communication service provided through the browser application on the first screen of the browser application. The reception module 210 may receive a second user input for communication with at least one counterpart device. The display module 220 may display a second screen of the browser application, which provides the communication service, on the display in response to the second user input.

In an embodiment, the reception module 210 may receive notification including the presence information of at least one counterpart device. The display module 220 may display the received presence information on the second screen of the browser application.

The storage module 240 according to various embodiments of the present disclosure may store at least a part of the received presence information. The storage module 240 may store the presence information of the electronic device.

In an embodiment, the storage module 240 may store at least a part of the received presence information in a database used by a particular application.

The transmission module 250 according to various embodiments of the present disclosure may transmit the presence information of the electronic device related to the communication service to a presence server.

In an embodiment, the reception module 210 may receive a first user input for executing the contact application. The execution module 230 may execute the contact application in response to the first user input. The display module 220 may display a screen of the contact application on the display according to the execution of the contact application. The display module 220 may display presence information of at least one counterpart device related to the communication service provided through the browser application on the screen of the contact application. The reception module 210 may receive a second user input for communication with at least one counterpart device. The display module 220 may display a second screen of the browser application, which provides the communication service, on the display in response to the second user input. The screen of the contact application may include one or more items indicating the presence information of at least one counterpart device. The one or more items may include one or more of a text, a symbol, an image, and an icon which indicate the presence information of at least one counterpart device.

In an embodiment, the reception module 210 may receive notification including the presence information of at least one counterpart device. The display module 220 may display the received presence information on the second screen of the browser application.

In an embodiment, the reception module 210 may receive notification including the presence information of at least one counterpart device. The storage module 240 may store a network address of at least one counterpart device included in the received presence information in a database of the contact application.

FIG. 3 illustrates a module system of the electronic device (for example, the electronic device 101) according to various embodiments of the present disclosure.

Referring to FIG. 3, a module system 300 may be controlled by an Application Processor (AP) and a Communication Processor (CP) and the module system 300 may be largely divided into an AP control region 301 and a CP control region 302. The module system 300 may be controlled by a processor including the AP and/or the CP or may be integrated into the processor.

The AP control region 301 may include a web application 304, an IMS application 305, a browser application 320, a first IMS module 360, and a control module 310. The browser application 320 may include a WebRTC module 330 and the WebRTC module 330 may include a plurality of components/engines/layers/sub-modules. The WebRTC module 330 may include a WebRTC API 331, a first session management/abstract signaling module 332, a first voice engine 350, a first video engine 340, and a first transport module 350. The first IMS module 360 may include a plurality of components/engines/layers/sub-modules. The first IMS module 360 may include a second session management/abstract signaling module 362 and a second video engine 370. The second video engine 370 may include a second image enhancement module 371 and a second video capture module 372. The control module 310 may include a plurality of components/engines/layers/sub-modules. The control module 310 may include a presence manager 311, a call/session control manager 312, an RTP control manager 313, and a codec control manager 314.

The CP control region 302 may include a second IMS module 362. The first IMS module 360 and the second IMS module 362 may be collectively called an IMS module. The second IMS module 362 may include a plurality of components/engines/layers/sub-modules. The second IMS module 362 may include a second voice engine 380 and a second transport module 390. The second voice engine 380 may include a second Error Correction (EC)/Noise Reduction (NR) module 381, a second audio jitter buffer 382, and a second audio capture/renderer module 383. The second transport module 390 may include a second Secure Real-time Transport Protocol (SPTP) module 391, a second multiplexing module 392, a second P2P STUN/TURN/ICE module 393, and a second network I/O module 394. An engine, a layer, a manager, an API or a buffer may be referred to as an engine module, a layer module, a manager module, an API module, or a buffer module.

The electronic device may allow the second voice engine 380 to be controlled by the CP to reduce current during a call and allow the AP to enter a sleep mode during the call.

The web application 304 may be a web (or World Wide Web)-based application providing a WebRTC service and may provide a real-time communication service such as a voice call, a video chatting, file transfer or the like by using or controlling the browser application 320 and/or the WebRTC module 330. The web application 304 may be integrated into the browser application 320.

The browser application 320 may be an application for reproducing, displaying, and searching for information resources on the web, include the WebRTC module 330, and control the WebRTC module 330. The browser application 320 may be referred to as a web browser application.

The WebRTC module 330 may provide functions to provide the WebRTC service and may include and/or control the WebRTC API 331, the first session management/abstract signaling module 332, the first voice engine 350, the first video engine 340, and the first transport module 350.

The WebRTC API 331 is an interface by which the web application 304 controls a function provided by the WebRTC module 330 and may include, for example, at least one interface or function (for example, instruction) for at least one of file control, window control, image processing, or text control.

The first session management/abstract signaling module 332 may perform a session related function such as session generation, session connection, session management and/or the like. The session may be provided for semi-permanent interactive information interchange between the electronic device and an external device and each of the electronic device and the external device may store information (that is, session information) on a history of the session for communication. The session information may include at least one of an inherent session and user preferences. The abstract signaling may refer to transmission or reception of the session information and the session information in the abstract signaling may include a supported format, a target to be transmitted, connection/network information.

The first voice engine 350 may perform a function as a framework for audio media transport from an audio module (for example, sound card) within the electronic device to the network. The first voice engine 350 may include and control an iSAC/iLBC/Opus codec, a voice NetEQ buffer, a first EC/NR module, and a first audio capture/renderer module.

The iSAC/iLBC/Opus codec may include an internet Speech Audio Codec (iSAC), an internet Speech Audio Codec (iLBC), and an Opus codec. The iSAC codec may be a wideband or ultra wideband codec for streaming an audio signal, provide a bitrate of 12 to 52 kbps, and use a sampling frequency of 16 kHz or 32 kHz. The iLBC codec may be a narrowband codec for a VoIP and a streaming audio signal, provide a bitrate of 15.2 kbps or 13.33 kbps, and use a sampling frequency of 8 kHz. The Opus codec may support a fixed or variable bitrate encoding of 6 kbps to 510 kbps and use a sampling frequency of 8 kHz to 48 kHz.

The voice NetEQ buffer may be a dynamic jitter buffer and may support an error concealment algorithm for correcting network jitter and packet loss.

The first EC/NR module is a signal processing component based on software and may remove sound echo of a voice input into a microphone in real time. The EC/NR module may remove particular types of background noise.

The first audio capture/renderer module may perform a function of receiving a voice by using the microphone or outputting a voice by using a speaker.

The first video engine 340 may perform a function as a framework for video media transport from a camera to a network or from a network to a display. The first video engine 340 may include and control a VP8 codec, a first video jitter buffer, a first image enhancement module, and a first video capture module.

The VP8 codec may be a video codec which performs an encoding or decoding of an input video.

The first video jitter buffer may correct or compensate a jitter effect and/or data loss during transmission/reception.

The first image enhancement module may perform a function of removing noise included in a video photographed by the camera.

The first video capture module may perform a function of photographing a video by using the camera.

The first transport module 350 may perform a function of communicating with the network. The first transport module 350 may be one layer which provides a point to point or host to host communication service for applications in a hierarchical structure of network components and protocol. The first transport module 350 may include and/or control a first SRTP module, a first multiplexing module, a first P2P STUN/TURN/ICE module, and a first network I/O module.

The first SRTP module defines a Real-time Transport Protocol (RTP) and may perform a function of providing communication using a Secure Real-time Transport protocol providing data encryption, message authentication and integrity.

The first multiplexing module may perform a function of collecting data for configuring a message and generating a message by assembling the collected data and a header.

The first P2P STUN/TURN/ICE module may perform a function of establishing a communication connection between the electronic device and an external device by using a Simple Traversal of UDP through Network address translation (STUN), Traversal Using Relay Network address translation (TURN), or Interactive Connectivity Establishment (ICE).

The first network I/O module may perform a function of outputting data/message/packet/frame to the network and processing an input of data/message/packet/frame from the network.

The IMS application 305 may be an application which provides a real-time communication service by using the IMS module, such as a voice all, a video call, a video chat, an IMS-based SMS, a conference call, an IM, a group chat, file transport, image/video sharing, presence and/or the like. The IMS application 305 may be a VoLTE application which provides a service such as a voice call, a video call, a conference call, an emergency call, an IMS-based SMS and/or the like or an RCS application which provides a service such as an IM, a group chat, presence, file transport, image/video sharing, Geo-Location and/or the like. The IMS application 305 may control the IMS module.

The IMS module may provide functions for providing the IMS service. The first IMS module 360 may include and control the second session management/abstract signaling module 362 and the second video engine 370, and the second IMS module 362 may include and control the second voice engine 380 and the second transport module 390.

The second session management/abstract signaling module 362 may perform a session related function such as session generation, session connection, session management and/or the like.

The second video engine 370 may perform a function as a framework for video media transport from a camera to a network or from a network to a display. The second video engine 370 may include and/or control the second image enhancement module 371, the second video capture module 372, and an H.263/H.264 codec.

The second image enhancement module 371 may perform a function of removing noise included in a video photographed by the camera.

The second video capture module 372 may perform a function of photographing a video by using the camera.

The second voice engine 380 may perform a function as a framework for audio media transport from an audio module (for example, sound card) within the electronic device to a network. The second voice engine 380 may include and/or control the second EC/NR module 381, the second audio jitter buffer 382, the second audio capture/renderer module 383, a G.7111 codec also known as a G.7XX codec (for example, Pulse Code Modulation: PCM), a G.721 codec using Adaptive Differential Pulse Code Modulation (ADPCM), and a G.729 codec using Conjugate-Structure Algebraic-code-Excited Linear Prediction (CS-ACELP).

The second EC/NR module 381 is a signal processing component based on software and may remove echo in a voice input into a microphone in real time. The second EC/NR module 381 may remove particular types of background noise.

The second audio jitter buffer 382 may perform correct or compensate a jitter effect and/or data loss during transmission/reception.

The second audio capture/renderer module 383 may perform a function of receiving a sound by using a microphone or outputting a sound by using a speaker.

The second transport module 390 may perform a function of communicating with the network. The second transport module 390 may be one layer which provides a point to point or host to host communication service for applications in a hierarchical structure of network components and protocol. The second transport module 390 may include a second Secure Real-time Transport Protocol (SPTP) module 391, a second multiplexing module 392, a second P2P STUN/TURN/ICE module 393, and a second network I/O module 394.

The second SRTP module 391 defines a Real-time Transport Protocol (RTP) and may perform a function of providing communication using a Secure Real-time Transport protocol providing data encryption, message authentication and integrity.

The second multiplexing module 392 may perform a function of collecting data for configuring a message and generating a message by assembling the collected data and a header.

The second P2P STUN/TURN/ICE module 393 may perform a function of establishing a communication connection between the electronic device and an external device by using a Simple Traversal of UDP through Network address translation (STUN), Traversal Using Relay Network address translation (TURN), or Interactive Connectivity Establishment (ICE).

The second network I/O module 394 may perform a function of outputting data/message/packet/frame to the network and processing an input of data/message/packet/frame from the network.

As illustrated in FIG. 3, most components of the WebRTC module 330 and most components of the IMS module which have the same name (for example, the first session management/abstract signal module 332 and the second session management/abstract signal module 362) except for an ordinal number (for example, first and second) functionally overlap each other, and the control module 310 may integratively control overlapping components having the same name/function and provide an interworking between the WebRTC module 330 and the IMS module.

The presence manager 311 may detect a state (for example, at least one of execution, termination, online, offline and the like) of the web application 304 or a state of the WebRTC service according to a user's selection or an automatic configuration and transmit state information of the web application 34 or the WebRTC service to the presence server.

The presence server supports such that presence information of a subscribed or registered user is shared with another subscribed or registered user. The presence information may include at least one of a current position of the user, available connection information of the user, session information (for example, at least one of a session ID, user preferences, a supported format and the like), state information (for example, execution, termination, online, offline or the like) of the IMS application 305 (or IMS service), state information (for example, execution, termination, online, offline or the like) of the web application 304 (or WebRTC service).

The presence manager 311 may enlist or register a user or a device of the user in the presence server according to a user's selection or an automatic configuration. Whenever the presence information of the user is changed, periodically, or according to event generation, the presence manager 311 may transmit a Session Initiation Protocol (SIP) PUBLISH message including the changed presence information of the user to the presence server. The PUBLISH message may include at least one of connection information (for example, an IP address, a port number or the like), identification information of an application or service, state information of the application or service, and session information (for example, at least one of a session ID, user preferences, a supported format and the like). The SIP may be a signaling communication protocol used for controlling a multimedia communication session such as a voice call, a video call or the like through an IP network.

The presence manager 311 may transmit a Session initiation Protocol (SIP) SUBSCRIBE message including a subscription request for presence information of another user (for example, a user registered in a contact database) to the presence server. The SUBSCRIBE message may include at least one of identification information and a phone number of another user.

The presence manager 311 may receive an SIP NOTIFY message including presence information of another user from the presence server. The presence manager 311 may transmit the presence information to a corresponding application, or store the presence information in a corresponding database or a memory (for example, the memory 130). The presence manager 311 may determine which one of the WebRTC service and the IMS service is related to the presence information included in the NOTIFY message. When the presence information is related to the WebRTC service, the presence manager 311 may transmit the presence information to the web application 304 or the contact application. When the presence information is related to the IMS service, the presence manager 311 may transmit the presence information to the IMS application 305 or the contact application.

The PUBLISH message or the NOTIFY message may include Session Description Protocol (SDP) data and the presence information may be included in the SDP data. The SDP may be a format for describing a multimedia communication session for the purpose of a notice of streaming media initialization parameters or session, session invitation, parameter negotiation and/or the like. The connection information of the presence information may be described using a c option of the SDP and the state information of the application or service of the presence information may be described using a new option of the SDP or one of pre-defined options. The presence manager 311 may obtain the presence information by parsing SDP data included in the NOTIFY message.

The call/session control manager 312 may store/manage/control session information on the WebRTC service and/or session information on the IMS service. When switching between the WebRTC service and the IMS service is made according to a user's selection or an automatic configuration, the call/session control manager 312 may hold either the WebRTC service or the IMS service, maintain session information of the held service, and provide the remaining service. The call/session control manager 312 may determine which one of the overlapping modules of the WebRTC module 330 and the IMS module will be used for the service. In an embodiment, the call/session control manager 312 may determine which one of the first voice engine 350 of the WebRTC module 330 and the second voice engine 380 of the IMS module will be used. The call/session control manager 312 may select a module to be used for the service based on a preference configuration value stored in the memory. When the service should be provided in the long term, the call/session control manager 312 may use a module in the CP control region which consumes a small amount of power. In an embodiment, when an operation mode of the WebRTC service is configured as a long term use mode, the call/session control manager 312 identifies whether the second voice engine 380 of the IMS module can be used to reduce power consumption. When the second voice engine 380 of the IMS module can be used, the call/session control manager 312 may provide the WebRTC service by using the second voice engine 380 of the IMS module.

The RTP control manager 313 may determine an application or a module to process an RTP packet received from the network. The WebRTC service and the IMS service may use the RTP as a media transport protocol. The RTP control manager 313 may determine which one of the WebRTC service and the IMS service is related to the RTP packet received from the network and transmit the RTP packet to an application or a module of the determined service.

The codec control manager 314 may determine which one of the codec of the WebRTC module 330 or the codec of the IMS module will be used for the service according to a user's selection or an automatic configuration. The WebRTC service may use at least one of a VP8 codec for video, an iLBC/iSAC codec for audio and the like and the IMS service may use at least one of an H.263/H.264 for video, a G.7XX codec for audio and the like. In an embodiment, the codec control manager 314 may allow the H.264 codec to be used instead of the VP8 codec in the WebRTC service according to a user's selection or an automatic configuration.

FIG. 4 illustrates a module system of the electronic device (for example, the electronic device 101) according to various embodiments of the present disclosure. Since a module system 400 of FIG. 4 has only a difference in that some components (for example, the first voice engine, the first video engine, and the transport engine) of the WebRTC module are removed, some components (for example, the session management/abstract signal module) of the IMS module are removed, and the control module is integrated into the first IMS module, an overlapping description of a function of each of the components will be omitted.

Referring to FIG. 4, the module system 400 may be controlled by an Application Processor (AP) and/or a Communication Processor (CP), and the module system 400 may be largely divided into an AP control region 401 and a CP control region 402. The module system 400 may be controlled by a processor including the AP and/or the CP or may be integrated into the processor.

The AP control region 401 may include a web application 404, an IMS application 405, a browser application 420, and a first IMS module 430. The browser application 420 may include a WebRTC module 430 and the WebRTC module 430 may include a plurality of components/engines/layers/sub-modules. The WebRTC module 430 may include a WebRTC API 431, a session management/abstract signaling module 432, and an IMS abstract layer 433. The first IMS module 460 may include a plurality of components/engines/layers/sub-modules. The first IMS module 460 may include a control module 410 and a video engine 470. The control module 410 may include a plurality of components/engines/layers/sub-modules. The control module 410 may include a presence manager 411, a call/session control manager 412, an RTP control manager 413, and a codec control manager 414.

The CP control region 402 may include a second IMS module 462. The first IMS module 460 and the second IMS module 462 may be collectively called an IMS module. The second IMS module 462 may include a plurality of components/engines/layers/sub-modules. The second IMS module 462 may include a voice engine 480 and a transport module 490. The voice engine 480 may include an EC/NR module 481, an audio jitter buffer 482, and an audio capture/renderer module 483. The transport module 490 may include an SRTP module 491, a multiplexing module 492, a P2P STUN/TURN/ICE module 493, and a network I/O module 494.

The web application 404 may provide a real-time communication service such as a voice call, a video chat, a file transfer and/or the like by using or controlling the browser application 420 and/or WebRTC module 430, and the IMS module.

The web application 404 may be a web (or world wide web)-based application which provides the WebRTC service and may provide a real-time communication service such as a voice call, a video chat, a file transfer and/or the like by using or controlling the WebRTC API 431 and session management/abstract signaling module 432 of the WebRTC module 430 and the voice engine 480, the video engine 470, and the transport module 490 of the IMS module. In order to use or control the voice engine 480 and the transport module 490 of the second IMS module 462 within the CP control region 402, the web application 404, the browser application 420, or the WebRTC module 430 may transmit a corresponding command to the CP through an IMS abstract layer 433.

The browser application 420 may be an application for reproducing, displaying, and searching for information resources on the web, include the WebRTC module 430, and control the WebRTC module 430.

The WebRTC module 430 may provide functions for providing the WebRTC service and include and/or control the session management/abstract signaling module 432 and the IMS abstract layer 433.

The WebRTC API 431 may serve as an interface by which the web application 404 controls a function provided by the WebRTC module 430.

The session management/abstract signaling module 432 may perform a session related function such as session generation, session connection, session management and/or the like.

The IMS abstract layer 433 may transmit a command of the web application 404 or the WebRTC module 430 to the CP.

The IMS application 405 may be an application which provides a real-time communication service by using the IMS module and the WebRTC module 430, such as a voice all, a video call, a video chat, an IMS-based SMS, a conference call, an IM, a group chat, file transport, image/video sharing, presence and/or the like.

The IMS application 405 may provide the real-time communication service by using or controlling the session management/abstract signaling module 432 of the WebRTC module 430 and the voice engine 480, the video engine 470, and the transport module 490 of the IMS module.

The IMS module may provide functions for providing the IMS service. The first IMS module 460 may include and/or control the control module 410 and the video engine 470, and the second IMS module 462 may include and/or control the voice engine 480 and the transport module 490.

The video engine 470 may perform a function as a framework for video media transport from a camera to a network or from a network to a display. The video engine 470 may include and control an image enhancement module, a video capture module, and an H.263/H.264 codec.

The control module 410 may provide an interworking between the WebRTC module 430 and the IMS module.

The presence manager 411 may enlist or register a user or a device of the user in the presence server. The presence manager 411 may transmit presence information related to the WebRTC service to the presence server. The presence manager 411 may transmit a subscription request for presence information of another user (for example, a user registered in a contact database) to the presence server. The presence manager 411 may receive presence information of another user from the presence server. The presence manager 411 may transmit the presence information to a corresponding application, or store the presence information in a corresponding database or the memory. When the presence information is related to the WebRTC service, the presence manager 411 may transmit the presence information to the web application or the contact application. When the presence information is related to the IMS service, the presence manager 411 may transmit the presence information to the IMS application or the contact application.

The call/session control manager 412 may store/manage/control session information on the WebRTC service and/or session information on the IMS service.

The RTP control manager 413 may determine an application or a module to process an RTP packet received from the network and may transmit the RTP packet to the determined application or module.

The codec control manager 414 may determine which one of a plurality of codecs will be used for the service according to a user's selection or an automatic configuration and use the determined codec for the service.

FIG. 5 is a flowchart illustrating a service providing method of the electronic device according to various embodiments of the present disclosure. FIGS. 6a to 8b are views for describing an application operating executing method of the electronic device according to various embodiments of the present disclosure. The service providing method may include operations 510 to 540.

In operation 510, a first screen of a browser application may be displayed on the display (for example, display 150) of the electronic device (for example, electronic device 101).

The browser application may be executed by a user input or an automatic configuration. The user input may be a hovering gesture, a touch gesture, user's eye gaze direction, a motion gesture of the user or the electronic device, a voice command or the like.

In an embodiment, the browser application may be executed according to a user's selection or an automatic configuration and the first screen of the browser application may be displayed on the display functionally connected to the electronic device. The screen of the application may be referred to as a Graphic User Interface (GUI), an application screen, an application window or the like. The browser application may be a basically provided application by a manufacturer of the electronic device or a user installation application.

In an embodiment, the browser application may be executed according to a user's selection or an automatic configuration, the screen of the browser application may be displayed on the display functionally connected to the electronic device, a menu or an item of the browser application may be selected by the user, and the first screen of the browser application may be displayed on the display functionally connected to the electronic device in response to the selection of the menu or the item.

In an embodiment, the web application may be executed according to a user's selection or an automatic configuration, the browser application may be automatically executed by a control of the web application, and the first screen of the browser application may be displayed on the display functionally connected to the electronic device.

In an embodiment, the web application may be executed according a user's selection or an automatic configuration, a menu or an item of the web application may be selected by the user, the browser application may be executed in response to the selection of the menu or the item, and the first screen of the browser application may be displayed on the display functionally connected to the electronic device.

When the browser application is executed by the user input, the user input may be received or detected through an input/output interface (for example, the input/output interface 140), a sensor module, a communication interface (for example, the communication interface 160), or a display (for the display 150). The user may select a button, an icon, or a menu (or menu item) through the input/output interface or the display, input a voice command through a microphone of the input/output interface, perform a gesture or a motion input through a camera of the sensor module, or input an execution command of a particular application wirelessly through the communication interface.

The screen may correspond to an image shown through the display when the application is executed.

The gesture or the motion input may refer to a case where the user draws a preset pattern, for example, a linear shape, a circle, a polygon (triangle or quadrangle), zigzag or the like in the air within a viewing angle of the camera module or a sensing range of the sensor module by using a hand or a finger. At this time, the gesture may be referred to as a space gesture in order to be distinguished from a touch gesture. The touch gesture may include a direct touch on the display or a hovering on the display.

A touch/hovering gesture using a user input unit (for example, a user's finger or a pen) may include at least one of touch, long touch, tap, double tap, flick, drag (or touch & move), drag & drop, swipe, multi-swipe, pinches, shake, and rotate according to an input method. The touch is a gesture of putting a user input unit on the display, the long touch (or touch & hold) is a gesture of lengthily touching the display, the tap is a gesture of quickly and lightly hitting the display, the double tap is a gesture of quickly hitting the display two times, the flick is a gesture (for example, scroll) of putting a user input unit on the display and quickly moving and then removing it, the drag is a gesture of moving or scrolling an item displayed on the display, the drag & drop is a gesture of moving an item while touching the display and then leaving from the display while stopping, the swipe is a gesture of moving within a predetermined range while touching the display by a user input unit, the multi-swipe is a gesture of moving within a predetermined range while touching the display by two or more user input units, and the pinch is a gesture of moving in different direction while touching the display by two or more user input units.

Referring to FIG. 6a, a home screen 607 may be displayed on a display 605 of an electronic device 600 and an item 610 of a web application and/or an item 620 of a browser application for executing (or logging in) the WebRTC service may be displayed on the home screen 607.

Referring to FIG. 6b, a user input 630 for selecting the item 610 of the web application may be received (or sensed or detected). In response to the user input 630, the web application may be executed. According to the execution of the web application, a screen of the web application may be displayed or a screen of the browser application related to the web application may be displayed. The web application may be executed in the background.

Referring to FIG. 7a, a screen 710 of the web application may be displayed on a display 705 of an electronic device 700 and a plurality of items corresponding to various functions of the WebRTC service may be displayed in at least partial areas of the display 705. The plurality of items may include at least one of a first item 721 for a voice call, a second item 722 for a video chat/video call/video conferencing, and a third item 723 for a file transfer. A user input for selecting one of the items may be received (or sensed or detected). In response to the user input, a function (or sub-services) of the WebRTC service corresponding to the selected item may be executed.

Referring to FIG. 7b, a screen 730 of the browser application may be displayed on a display 705 of the electronic device 700 and a plurality of items corresponding to various functions of the WebRTC service may be displayed in at least partial areas of the display 705. The plurality of items may include at least one of a first item 741 for a voice call, a second item 742 for a video chat/video call/video conferencing, and a third item 743 for a file transfer. A user input for selecting one of the items may be received (or sensed or detected). In response to the user input, a function of the WebRTC service corresponding to the selected item may be executed.

In operation 520, presence information of at least one counterpart device related to a communication service provided through the browser application may be displayed on the display of the electronic device. The presence information may be displayed on a first screen of the browser application.

In operation 530, a second user input for communication with at least one counterpart device may be received.

In operation 540, in response to the second user input, a second screen of the browser application providing the communication service may be displayed.

Referring to FIG. 8a, a first screen 810 of the browser application may be displayed on a display 805 of an electronic device 800. Presence information of at least one counterpart device related to the WebRTC service may be displayed in a partial area of the display 805. The first screen 810 of the browser application may include at least one of an address input window 820 for inputting an IP address (and port), a text input window 840 for inputting a text, a message window 844 for displaying transmitted and received messages, a first video screen 850 photographed by a camera of the electronic device 800, a first item 831 for a voice call, and a third item 833 for a file transfer.

The first screen 810 of the browser application may include a contact list 860 including contact information registered in the electronic device 800. The contact list 860 may include contact information 861 and 864 of a plurality of users. Each of the contact information may include various pieces of information such as presence information related to the WebRTC service, a user image and/or the like. Contact information 861 of user B may include an indicator 862 indicating that an electronic device of user B is executing (or logging in) the WebRTC service. The indicator 862 may be one or more of a text, a symbol, an image, and an icon. When an electronic device of user F is not executing the WebRTC service, contact information 864 of user F may not include the indicator. In an embodiment, when the electronic device of user F is not executing the WebRTC service, the contact information 864 of user F may include an indicator (for example, WebRTC service OFF) indicating that the electronic device of user F is not executing the WebRTC service.

Referring to FIG. 8b, the electronic device 800 may detect a user input (or selection) for contact information of user B, establish a connection with the electronic device of user B, and perform a video conference with the electronic device of user B. A second screen 812 of the browser application may include a first video screen 850 photographed by a camera of the electronic device and a second video screen 852 showing a second video received from the electronic device of user B. The first and second videos may be real-time videos generated by photographing a user through cameras of corresponding electronic devices. The electronic device 800 may transmit the real-time video of the user to the electronic device of user B. The electronic device 800 may display the second video received from the electronic device of user B on the display 805. The electronic device 800 may transmit a voice of the user recorded using a microphone to the electronic device of user B. The electronic device 800 may output the voice received from the electronic device of user B through a speaker. The electronic device 800 may transmits a text input into the text input window 840 by the user to the electronic device of user B in response to a selection of a message sending button 842. The electronic device 800 may display the transmitted message and the message received from the electronic device of user B on the display 805. The electronic device 800 may detect a user input (or selection) selecting the first item for the voice call and a user input (or selection) selecting one piece of contact information of the contact list 860, establish a connection with the electronic device of the selected contact information (or a user of the selected contact information), and perform the voice call with the electronic device of the selected contact information. During the voice call, the electronic device 800 may transmit a voice of the user recorded using the microphone to the electronic device of the selected contact information in real time and output the voice received from the electronic device of the selected contact information through the speaker. The electronic device 800 may detect a user input (or selection) selecting the third item 833 for the file transfer, display a file search window, and transmit a file selected by the user to the electronic device of user B.

FIG. 9 is a flowchart illustrating a service providing method of the electronic device according to various embodiments of the present disclosure. The service providing method may include operations 910 to 940.

In operation 910, a screen of a contact application may be displayed on the display (for example, display 150) of the electronic device (for example, electronic device 101).

The contact application may be executed by a user input or an automatic configuration. The user input may be a hovering gesture, a touch gesture, the user's eye gaze direction, a motion gesture of the user, a voice command or the like. The contact application may be automatically executed according to an execution of a phone application.

In operation 920, presence information of at least one counterpart device related to a communication service provided through the browser application may be displayed on the display of the electronic device. The presence information may be displayed on the screen of the contact application.

In operation 930, a user input for communication with at least one counterpart device may be received.

In operation 940, in response to the user input, the screen of the browser application providing the communication service may be displayed.

Referring to FIG. 10a, a screen 1010 of the contact application may be displayed on a display 1005 of an electronic device 1000 and the screen 1010 of the contact information may include a plurality of pieces of contact information 1020 and 1021. Each of the contact information may include various pieces of information such as presence information related to the WebRTC service, a user image and/or the like. The presence information may be displayed in various ways as well as an indicator 1030. In order to distinguish between contact information which is executing the WebRTC service and contact information which is not executing the WebRTC service, contact information 1020 which is executing the WebRTC service may be emphasized.

Such an emphasis may include at least one of a visual emphasis, auditory emphasis, a tactile emphasis and the like. For example, the visual emphasis may be implemented by displaying at least one of an icon, an image, a text and the like or displaying the contact information 1020 which is executing the WebRTC service such that at least one of a color, a shape, transparency, a location and the like of the contact information 1020 is different from that of the contact information 1021 which is not executing the WebRTC service. For example, the auditory emphasis may be implemented by outputting a voice (for example, audio guidance) or a sound (for example, notification sound) when the user selects contact information. For example, the tactile emphasis may be implemented by providing a vibration when the user selects the contact information 1020 which is executing the WebRTC service. In the present embodiment, the contact information 1020 which is executing the WebRTC service may be emphasized by an indicator 1030 of W.

A screen part for receiving an input for communication may be all or some of the contact screen 1010. For example, the screen part 1022 may be a call icon.

When the user selects the screen part 1022 of the contact information 1020 which is executing the WebRTC service in the contact screen illustrated in FIG. 10*a* as indicated by a reference numeral 1040, a screen part 1050 for designating at least one of the various functions (or sub-services) of the WebRTC service may be displayed as illustrated in FIG. 10*b*. The screen part 1050 may include a first item 1051 for a voice call and a second item 1052 for a video chat/video call/video conferencing. The user may designate a desired service or function by selecting one of the first and second items 1051 and 1052. For example, the selection of the item by the user may be detected and a function (or sub-services) of the WebRTC service corresponding to the selected item may be executed in response to the selection by the user. In the present embodiment, the electronic device 1000 may detect the selection 1042 of the second item 1052 by the user, establish a connection with the electronic device of the selected contact information, and perform a video call with the electronic device of the selected contact information as illustrated in FIG. 8*b*.

FIG. 11 is a flowchart illustrating a service providing method of the electronic device according to various embodiments of the present disclosure. The service providing method may include operations 1110 to 1155. Each of a first electronic device 1001, a presence server 1102, and a second electronic device 1103 may have an equal or similar configuration to that of the electronic device illustrated in FIG. 1.

In operation 1110, the first electronic device 1101 may transmit a first message including a subscription request for WebRTC related presence information of the second electronic device 1103 (or a user of the second electronic device 1103) to the presence server 1102. The first message include at least one of identification information (for example, at least one of a phone number, an account (for example, a Social Network Service (SNS) account, an internet account, an email account or the like), an address and the like) of the first electronic device 1101 or the user (or subscriber) of the first electronic device 1101, identification information (for example, at least one of a phone number, an account (for example, an SNS account, an internet account, an email account or the like), an address and the like) of the first second electronic device 1103 or the user (or subscriber) of the second electronic device 1103, connection information or network information (for example, an IP address, a part number and/or the like) of the first electronic device 1101, and session information (for example, at least one of a session ID, user preferences, a supported format and the like) of the first electronic device 1101. The first message may be an SIP SUBSCRIBE message. The first message may include SDP data.

In operation 1115, the presence server 1102 may update presence information of a corresponding subscriber stored in a memory of the presence server 1102 or a database within the memory based on content of the first message. For example, the database may have a data structure below.

TABLE 1

| Subscriber identification information | Connection information | Session information | IMS state | WebRTC state | Subscriber | ... |
|---|---|---|---|---|---|---|
| A1 | B1 | C1 | D1 | E1 | F1 | ... |
| A2 | B2 | C2 | D2 | E2 | F2 | ... |
| ... | ... | ... | ... | ... | ... | ... |

The database includes the presence information of a plurality of subscribers, and each piece of presence information may include at least one of subscriber/device identification information, connection information, session information, IMS state information, WebRTC state information, and subscriber information (that is, information on a subscriber which has made a request for subscribing to at least one of the IMS presence information and the WebRTC state information).

In operation 1120, the second electronic device 1103 may execute or log in the WebRTC service. The second electronic device 1103 may execute the WebRTC service by executing the browser application and/or the web application providing the WebRTC service. The browser application and/or the web application providing the WebRTC service may be also referred to as a WebRTC application.

In operation 1125, the second electronic device 1103 may transmit a second message including current presence information to the presence server 1102 according to the execution of the WebRTC service. The second message may include at least one of identification information of the second electronic device 1103 or the user, connection information (for example, an IP address, a port number and/or the like), identification information of an application or service, session information, and WebRTC state information. The WebRTC state information may include state information (for example, at least one of execution, termination, online, offline and the like) of the WebRTC service or the WebRTC application. The second message may be a PUBLISH message.

In operation 1130, the presence server 1102 may identify a subscriber to subscribe to the presence information of the second electronic device 1103 based on content of the second message.

In operation 1135, the presence server 1102 may transmit a third message including WebRTC related presence information of the second electronic device to the first electronic device 1101 which has made a request for subscribing to the presence information of the second electronic device 1103.

The third message may include at least one of identification information of the first electronic device 1101 or the user of the first electronic device 1101, identification information of the second electronic device 1103 or the user of the second electronic device 1103, connection information or network information of the second electronic device 1103, session information (for example, at least one of a session ID, user preferences, a supported format and the like) of the second electronic device 1103, and state information of the WebRTC service or the WebRTC application. The third message may be an SIP NOTIFY message.

In operation 1140, the first electronic device 1101 may update the presence information of the second electronic device 1103 (or user of the second electronic device 1103) stored in a memory of the first electronic device 1101 or a database in the memory based on content of the third message. In an embodiment, the database may be a contact database of the contact application. For example, the database may have a data structure below.

TABLE 2

| Contact identification information | Name | Phone number | Email | WebRTC state | WebRTC connection information | ... |
|---|---|---|---|---|---|---|
| G1 | H1 | I1 | J1 | K1 | L1 | ... |
| G2 | H2 | I2 | J2 | K2 | L2 | ... |
| ... | ... | ... | ... | ... | ... | ... |

The database includes information on a plurality of pieces of contact information and each piece of contact information may include at least one of contact identification information, a name, a phone number, an email, and presence information (for example, WebSTC state information and/or WebRTC connection information).

For example, a state of contact information which is not executing the WebRTC service illustrated in FIG. 10a may be changed to a state in which the WebRTC service is being executed according to an update of the database.

In operation 1145, presence information of the second electronic device 1103 may be displayed on the display of the first electronic device 1101 and a user input (that is, selection information of the second electronic device) for WebRTC communication with the second electronic device 1103 may be received.

In operation 1150, the first electronic device 1101 may connect a session for WebRTC communication with the second electronic device 1103 based on the presence information of the second electronic device 1103. For example, the first electronic device 1101 may transmit an offer message for a session connection to the second electronic device 1103 by using connection information or network information (for example, an IP address, a port number or the like) of the second electronic device. The offer message may include at least one of identification information (for example, at least one of a phone number, an account, an address and the like) of the first electronic device 1101 or the user of the first electronic device 1101, connection information or network information (for example, an IP address, a port number or the like) of the first electronic device 1101, session information (for example, at least one of a session ID, user preferences, a supported format and the like) of the first electronic device 1101, and a network address (for example, an IP address, a port number of the like) of the second electronic device 1103.

The second electronic device 1103 may transmit a response message including response (for example, acceptance or rejection) to a connection request of the first electronic device 1101 to the first electronic device 1101. The response message may include at least one of identification information of the second electronic device 1103 or the user of the second electronic device 1103, session information (for example, at least one of a session ID, user preferences, a supported format and the like received from the first electronic device 1101) of the second electronic device 1103, a network address (for example, an IP address, a port number or the like) of the first electronic device 1101. Through an exchange between the offer message and the response message, a session for WebRTC communication may be established between the first electronic device 1101 and the second electronic device 1103.

In operation 1155, WebRTC communication may be performed between the first electronic device 1101 and the second electronic device 1103. An SRTP may be used for the WebRTC communication.

According to various embodiments of the present disclosure, the electronic device may include a display that displays screens; a processor that displays, on the display of the electronic device, presence information of one or more counterpart devices associated with a first communication service provided through a browser application, receives a user input for communication with the one or more counterpart devices, and displays, on the display, a second screen of the browser application providing a first communication service in response to the user input; a first module including a plurality of modules for providing the first communication service; a second module including a plurality of modules for providing a second communication service; and a control module that controls the first module and the second module.

According to various embodiments of the present disclosure, the control module may include a presence manager module that receives notification including the presence information of the one or more counterpart devices from a presence server, determine which one of the first and second communication services is associated with the presence information, and process the presence information based on the determination.

According to various embodiments of the present disclosure, the control module may include a call/session control manager module that provides switching between the first and second communication services.

According to various embodiments of the present disclosure, the control module may include a Real-time Transport Protocol (RTP) control manager module that receives an RTP packet from an external device, determines which one of the first and second communication services is associated with the RTP packet, and processes the RTP packet based on the determination.

According to various embodiments of the present disclosure, the control module may include a codec control manager module that controls the use of a codec in the first or second communication service.

According to various embodiments of the present disclosure, one of the first and second modules (or communication services) may use the other one module of the first and second modules (or communication services) through the control module According to various embodiments of the present disclosure, a method of providing a service by an electronic device may include: displaying, on a display of the electronic device, presence information of one or more counterpart devices associated with a communication service provided through a browser application; receiving a user input for communication with the one or more counterpart devices; and displaying a second screen of the browser application providing the communication service in response to the user input.

According to various embodiments of the present disclosure, the presence information may be displayed on a screen of a contact application including contact information registered in the electronic device.

According to various embodiments of the present disclosure, the method may further include: receiving a user input for executing the contact application; executing the contact application in response to the user input; and displaying the screen of the contact application according to the execution of the contact application.

According to various embodiments of the present disclosure, the screen of the contact application may include one or more items indicating the presence information of the one or more counterpart devices.

According to various embodiments of the present disclosure, the screen of the contact application may include one or more of a text, a symbol, an image, and an icon indicating the presence information of the one or more counterpart devices.

According to various embodiments of the present disclosure, the presence information may indicate whether the one or more counterpart devices are executing the communication service provided through a browser application of the one or more counterpart devices.

According to various embodiments of the present disclosure, the presence information may indicate whether at least one counterpart device is executing an application of at least one counterpart device providing the communication service.

According to various embodiments of the present disclosure, the communication service may correspond to a voice call, a video call, a video chat, a video conference, or file transfer.

According to various embodiments of the present disclosure, the second screen of the browser application may include a first video photographed by the electronic device and a second video photographed by the one or more counterpart devices.

According to various embodiments of the present disclosure, the second screen of the browser application may further include the presence information of the one or more counterpart devices.

According to various embodiments of the present disclosure, the presence information may be displayed on a first screen of the browser application.

According to various embodiments of the present disclosure, the method may further include: receiving a user input for executing the browser application; executing the browser application in response to the user input; and displaying the first screen of the browser application according to the execution of the browser application.

According to various embodiments of the present disclosure, the method may further include: receiving notification including the presence information of the one or more counterpart devices; and displaying the received presence information on the second screen of the browser application.

According to various embodiments of the present disclosure, the method may further include: receiving notification including the presence information of the one or more counterpart devices; and storing network addresses of the one or more counterpart devices included in the received presence information in a database of the contact application.

According to various embodiments of the present disclosure, the method may further include transmitting presence information of the electronic device associated with the communication service to a presence server.

According to various embodiments of the present disclosure, an electronic device may include: a display that displays screens; and a processor that displays, on the display of the electronic device, presence information of one or more counterpart devices associated with a communication service provided through a browser application, receives a user input for communication with the one or more counterpart devices, and displays, on the display, a second screen of the browser application providing the communication service in response to the user input.

According to various embodiments of the present disclosure, the presence information may be displayed on a screen of a contact application including contact information registered in the electronic device.

According to various embodiments of the present disclosure, the processor may receive a user input for executing the contact application, execute the contact application in response to the user input, and display the screen of the contact application on the display according to the execution of the contact application.

According to various embodiments of the present disclosure, the screen of the contact application may include one or more items indicating the presence information of the one or more counterpart devices.

According to various embodiments of the present disclosure, the screen of the contact application may include one or more of a text, a symbol, an image, and an icon indicating the presence information of the one or more counterpart devices.

According to various embodiments of the present disclosure, the presence information may indicate whether the one or more counterpart devices are executing the communication service provided through a browser application of the one or more counterpart devices.

According to various embodiments of the present disclosure, the communication service may correspond to a voice call, a video call, a video chat, a video conference, or a file transfer.

According to various embodiments of the present disclosure, the second screen of the browser application may include a first video photographed by the electronic device and a second video photographed by the one or more counterpart devices.

According to various embodiments of the present disclosure, the second screen of the browser application may further include the presence information of the one or more counterpart devices.

According to various embodiments of the present disclosure, the presence information may be displayed on a first screen of the browser application.

According to various embodiments of the present disclosure, the processor may receive a user input for executing the browser application, execute the browser application in response to the user input, and display a first screen of the browser application on the display according to the execution of the browser application.

According to various embodiments of the present disclosure, the processor may receive notification including the presence information of the one or more counterpart devices from a presence server and display the received presence information on the second screen of the browser application.

According to various embodiments of the present disclosure, the processor may receive the presence information of the one or more counterpart devices and store network addresses of the one or more counterpart devices included in the received presence information in a database of the contact application.

According to various embodiments of the present disclosure, the processor may transmit presence information of the electronic device associated with the first communication service to a presence server by using a communication module of the electronic device.

According to various embodiments of the present disclosure, the electronic device may further include a first module including a plurality of modules for providing the first communication service; a second module including a plurality of modules for providing a second communication service; and a control module that controls the first module and the second module.

According to various embodiments of the present disclosure, the control module may include a presence manager module that receives notification including the presence information of the one or more counterpart devices from a presence server, determines which one of the first and second communication services is associated with the presence information, and processes the presence information based on the determination.

According to various embodiments of the present disclosure, the control module may include a call/session control manager module that provides switching between the first and second communication services.

According to various embodiments of the present disclosure, the control module may include a Real-time Transport Protocol (RTP) control manager module that receives an RTP packet from an external device, determines which one of the first and second communication services is associated with the RTP packet, and processes the RTP packet based on the determination.

According to various embodiments of the present disclosure, the control module may include a codec control manager module that controls the use of a codec in the first or second communication service.

According to various embodiments of the present disclosure, one of the first and second modules may use the other one module of the first and second modules through the control module.

FIG. 12 is a block diagram 1200 of an electronic device 1201 according to various embodiments of the present disclosure. The electronic device 1201 may constitute, for example, all or a part of the electronic device 101 shown in FIG. 1. Referring to FIG. 12, the electronic device 1201 may include at least one of a processor 1212 including one or more Application Processors (APs) 1210 and/or one or more Communication Processors (CPs) 1211, a communication module 1220, a Subscriber Identifier Module (SIM) card 1224, a memory 1230, a sensor module 1240, an input device 1250, a display 1260, an interface 1270, an audio module 1280, a camera module 1291, a power management module 1295, a battery 1296, an indicator 1297, and a motor 1298.

The AP 1210 may control a plurality of hardware or software components connected to the AP 1210 by driving an operating system or an application program, process various data including multimedia data, and perform calculations. The AP 1210 may be implemented by, for example, a System on Chip (SoC). According to an embodiment, the AP 1210 may further include a Graphic Processing Unit (GPU).

The communication module 1220 (for example, the communication interface 160) may perform data transmission/reception in communication between the electronic device 1201 (for example, the electronic device 101) and other electronic devices (for example, the electronic device 104 or the server 106) connected to the electronic device 1201 through a network. According to an embodiment, the communication module 1220 may include at least one of a cellular module 1221, a Wi-Fi module 1223, a BlueTooth (BT) module 1225, a Global Positioning System (GPS) module 1227, a Near Field Communication (NFC) module 1228, and a Radio Frequency (RF) module 1229.

The cellular module 1221 may provide at least one of a voice call, a video call, a message service, and an Internet service through a communication network (for example, LTE, LTE-A, CDMA, WCDMA, UMTS, WiBro, GSM, or the like). Further, the cellular module 1221 may identify and authenticate an electronic device in a communication network by using, for example, a subscriber identification module (for example, the SIM card 1224). According to an embodiment, the cellular module 1221 may perform at least some of functions which the AP 1210 may provide. For example, the cellular module 1221 may perform at least a part of a multimedia control function.

According to an embodiment, the CP 1211 may be included in the cellular module 1221. Further, the cellular module 1221 may be implemented as, for example, an SoC. Although the cellular module 1221 (for example, the CP 1211), the memory 1230, and the power management module 1295 are illustrated as components separated from the AP 1210 in FIG. 12, the AP 1210 may be implemented to include at least some of the above described components (for example, the cellular module 1221) according to an embodiment.

According to an embodiment, the AP 1210 or the cellular module 1221 (for example, the CP 1211) may load commands or data received from at least one of a non-volatile memory and other components connected thereto to a volatile memory, and may process the loaded commands or data. Further, the AP 1210 or the cellular module 1221 may store data received from or generated by at least one of the other components in a non-volatile memory.

Each of the Wi-Fi module 1223, the BT module 1225, the GPS module 1227, and the NFC module 1228 may include, for example, a processor for processing data transmitted/received through the corresponding module. Although the cellular module 1221, the Wi-Fi module 1223, the BT module 1225, the GPS module 1227, and the NFC module 1228 are illustrated as individual blocks in FIG. 12, at least some (for example, two or more) of the cellular module 1221, the Wi-Fi module 1223, the BT module 1225, the GPS module 1227, and the NFC module 1228 may be included within one Integrated Chip (IC) or one IC package. For example, at least some (for example, the CP 1211 corresponding to the cellular module 1221 and a Wi-Fi processor corresponding to the Wi-Fi module 1223) processors corresponding to the cellular module 1225, the Wi-Fi module 1227, the BT module 1228, the GPS module 1221, and the NFC module 1223, respectively, may be implemented as one SoC.

The RF module 1229 may transmit/receive data, for example, an RF signal. Although not illustrated, the RF module 1229 may include at least one of, for example, a transceiver, a Power Amp Module (PAM), a frequency filter, a Low Noise Amplifier (LNA) and the like. The RF unit 1229 may further include a component for transmitting/receiving an electromagnetic wave in free air space in radio communication, such as at least one of a conductor, a conducting wire and the like. Although the cellular module 1221, the Wi-Fi module 1223, the BT module 1225, the GPS module 1227, and the NFC module 1228 are illustrated to share one RF module 1229 in FIG. 12, at least one of the cellular module 1229, the Wi-Fi module 1221, the BT module 1223, the GPS module 1225, and the NFC module 1227 may transmit/receive the RF signal through a separate RF module.

The SIM card 1224 may be a card including a subscriber identification module, and may be inserted into a slot formed in a particular portion of the electronic device. The SIM card 1224 may include unique identification information (for example, Integrated Circuit Card IDentifier (ICCID)) or subscriber information (for example, International Mobile Subscriber Identity (IMSI)).

The memory 1230 (for example, the memory 130) may include an internal memory 1232 or an external memory 1234. The internal memory 1232 may include at least one of a volatile memory (for example, a Dynamic Random Access Memory (DRAM), a Static RAM (SRAM), a Synchronous Dynamic RAM (SDRAM), or the like) or a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

According to an embodiment, the internal memory 1232 may be a Solid State Drive (SSD). The external memory 1234 may further include a flash drive, for example, at least one of a Compact Flash (CF), a Secure Digital (SD), a Micro Secure Digital (Micro-SD), a Mini Secure Digital (Mini-SD), an extreme Digital (xD), a memory stick and/or the like. The external memory 1234 may be functionally connected with the electronic device 1201 through various interfaces. According to an embodiment, the electronic device 1201 may further include a storage device (or storage medium) such as a hard drive.

The sensor module 1240 may measure a physical quantity or detect an operation state of the electronic device 1201, and may convert the measured or detected information to an electronic signal. The sensor module 1240 may include at least one of, for example, a gesture sensor 1240A, a gyro sensor 1240B, an atmospheric pressure sensor 1240C, a magnetic sensor 1240D, an acceleration sensor 1240E, a grip sensor 1240F, a proximity sensor 1240G, a color sensor 1240H (for example, a Red/Green/Blue (RGB) sensor), a bio-sensor 1240I, a temperature/humidity sensor 1240J, an illumination sensor 1240K, and an Ultra Violet (UV) sensor 1240M. Additionally or alternatively, the sensor module 1240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor and/or the like. The sensor module 1240 may further include a control circuit for controlling one or more sensors included therein.

The input device 1250 may include a touch panel 1252, a (digital) pen sensor 1254, a key 1256, or an ultrasonic input device 1258. The touch panel 1252 may recognize a touch input through at least one of, for example, a capacitive type, a resistive type, an infrared type, and an acoustic wave type. The touch panel 1252 may further include a control circuit. The capacitive type touch panel may recognize a physical contact or proximity. The touch panel 1252 may also further include a tactile layer. In this case, the touch panel 1252 may provide a tactile reaction to a user.

The (digital) pen sensor 1254 may be implemented, for example, using a method identical or similar to a method of receiving a touch input of a user, or using a separate recognition sheet. The key 1256 may include, for example, a physical button, an optical key or a keypad. The ultrasonic input device 1258 is a device which can detect an acoustic wave by a microphone (for example, microphone 1288) of the electronic device 1201 through an input tool generating an ultrasonic signal to identify data, and can perform wireless recognition. According to an embodiment, the electronic device 1201 may also receive a user input from an external device (for example, a computer or server) connected thereto, using the communication module 1220.

The display 1260 (for example, the display 120) may include a panel 1262, a hologram device 1264, or a projector 1266. For example, the panel 1262 may be a Liquid Crystal Display (LCD) or an Active Matrix Organic Light Emitting Diode (AM-OLED). The panel 1262 may be implemented to be, for example, flexible, transparent, or wearable. The panel 1262 may be also configured as one module together with the touch panel 1252. The hologram 1264 may show a stereoscopic image in the air using interference of light. The projector 1266 may project light onto a screen to display an image. For example, the screen may be located inside or outside the electronic device 1201. According to an embodiment, the display 1260 may further include a control circuit for controlling the panel 1262, the hologram device 1264, or the projector 1266.

The interface 1270 may include, for example, a High-Definition Multimedia Interface (HDMI) 1272, a Universal Serial Bus (USB) 1274, an optical interface 1276, or a D-subminiature (D-sub) 1278. The interface 1270 may be included in, for example, the communication interface 160 illustrated in FIG. 1. Additionally or alternatively, the interface 290 may include, for example, a Mobile High-definition Link (MHL) interface, a Secure Digital (SD) card/Multi-Media Card (MMC) interface, or an Infrared Data Association (IrDA) standard interface.

The audio module 1280 may bilaterally convert a sound and an electronic signal. At least some components of the audio module 1280 may be included in, for example, the input/output interface 140 illustrated in FIG. 1. The audio module 1280 may process sound information input or output through, for example, at least one of a speaker 1282, a receiver 1284, earphones 1286, and the microphone 1288.

The camera module 1291 is a device which can photograph a still image and a moving image. According to an embodiment, the camera module 291 may include one or more image sensors (for example, a front sensor or a rear sensor), a lens (not illustrated), an Image Signal Processor (ISP) (not illustrated) or a flash (not illustrated) (for example, an LED or xenon lamp).

The power management module 1295 may manage power of the electronic device 1201. Although not illustrated, the power management module 1295 may include, for example, a Power Management Integrated Circuit (PMIC), a charger Integrated Circuit (IC), or a battery or fuel gauge.

The PMIC may be mounted to, for example, an integrated circuit or a SoC semi-conductor. Charging methods may be classified into a wired charging method and a wireless charging method. The charger IC may charge a battery and prevent over voltage or over current from being flowed from a charger. According to an embodiment, the charger IC may include a charger IC for at least one of the wired charging method and the wireless charging method. The wireless charging method includes a magnetic resonance scheme, a magnetic induction scheme, or an electromagnetic scheme, and an additional circuit for wireless charging, such as a coil loop circuit, a resonance circuit, a rectifier circuit and/or the like may be added.

The battery gauge may measure, for example, a remaining quantity of the battery 1296, or a voltage, a current, or a temperature during the charging. The battery 1296 may store or generate electricity, and may supply power to the electronic device 1201 using the stored or generated electricity. The battery 1296 may include, for example, a rechargeable battery or a solar battery.

The indicator 1297 may display a particular status of the electronic device 1201 or a part thereof (for example, the AP 1210), for example, at least one of a booting status, a message status, a charging status and the like. The motor 1298 may convert an electrical signal to a mechanical vibration. Although not illustrated, the electronic device 1201 may include a processing unit (for example, a GPU) for supporting a mobile TV. The processing unit for supporting the mobile TV may process, for example, media data according to a standard of Digital Multimedia Broadcasting (DMB), Digital Video Broadcasting (DVB), media flow or the like.

The aforementioned elements of the electronic device according to various embodiments of the present disclosure may be configured with one or more components, and the name of the corresponding element may vary depending on a type of the electronic device. The electronic device according to the various embodiments of the present disclosure may include at least one of the aforementioned elements or may further include other additional elements, or some of the aforementioned elements may be omitted. Also, a few of component elements of an electronic device according to various embodiments of the present disclosure are coupled to form a single entity, and may equivalently execute functions of the corresponding component elements which are not coupled.

The term "module" used in the various embodiments of the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the various embodiments of the present disclosure may include at least one of an Application-Specific Integrated Circuit (ASIC) chip, a Field-Programmable Gate Arrays (FPGA), and a programmable-logic device for performing operations which have been known or are to be developed hereinafter.

According to various embodiments, at least part of a device (for example, modules or functions thereof) or a method (for example, operations) according to the various embodiments of the present disclosure may be embodied by, for example, an instruction stored in a computer readable storage medium provided in a form of a programming module. When the command is executed by one or more processors (for example, the processor 120), the one or more processors may execute a function corresponding to the command. The computer readable storage media may be, for example, the memory 130. At least a part of the programming module may be implemented (for example, executed) by, for example, the processor 120. At least a part of the programming module may include, for example, a module, a program, a routine, a set of instructions, or a process for performing at least one function.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and/or the like. Further, the program commands may include high class language codes that can be executed in a computer by using an interpreter, as well as machine language codes that are made by a compiler. The aforementioned hardware device may be configured to operate as one or more software modules in order to perform the operation of various embodiments of the present disclosure, and vice versa.

A programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Also, a few operations may be executed based on a different order, may be omitted, or may additionally include another operation.

According to various embodiments of the present disclosure, a storage medium storing commands is configured to allow one or more processor to perform one or more operations when the commands are executed by the one or more processor. The one or more operations may include displaying, on a display of the electronic device, presence information of one or more counterpart devices associated with a communication service provided through a browser application; receiving a user input for communication with the one or more counterpart devices; and displaying, on the display, a second screen of the browser application providing the communication service in response to the user input.

Exemplary embodiments of the present disclosure shown and described in this specification and the drawings correspond to specific examples presented in order to easily describe technical contents of the present disclosure and to help comprehension of the present disclosure, and are not intended to limit the scope of the present disclosure. Accordingly, all alterations and modifications deduced on the basis of the technical spirit of the present disclosure in addition to the embodiments disclosed herein should be construed as being included in the scope of the present disclosure.

The invention claimed is:

1. An electronic device comprising:
   a display configured to display screens;
   a first communication circuit configured to provide a first communication service;
   a second communication circuit configured to provide a second communication service, wherein the first communication circuit and the second communication circuit provide overlapping communication functionality:
   a processor configured to:
   display, on the display, a plurality of objects corresponding to a plurality of counterpart devices respectively, wherein each of the plurality of counterpart devices is associated with one or more of a-the first communication service provided through a browser application and a-the second communication service provided through an internet protocol (IP) multimedia subsystem (IMS);
   display, on the display, one or more first icons indicating presence information of one or more counterpart devices among the plurality of counterpart devices, wherein the one or more counterpart devices are differentiated, by the one or more displayed first icons, from remaining one or more counterpart devices among the plurality of counterpart devices, and wherein the one or more counterpart devices are associated with the first communication service and the second communication service and the remaining one or more counterpart devices are associated with the second communication service;

receive a first user input for selecting at least one counterpart device among the one or more counterpart devices associated with the first communication service and the second communication service;

in response to receiving the first user input, display, on the display, a screen of the browser application for providing the first communication service;

determine whether to use the second communication circuit based on a power consumption for providing the first communication service by the first communication circuit and the second communication circuit; and in response to determining to use the second communication circuit based on the second communication circuit consumes a smaller amount of power, provide the first communication service with the selected at least one counterpart device using the first communication circuit and the second communication circuit.

2. The electronic device of claim 1, wherein the processor is further configured to:

receive notification including the presence information of the one or more counterpart devices from a presence server;

determine which one of the first communication service or the second communication service is associated with the presence information; and process the presence information based on the determination.

3. The electronic device of claim 1, wherein the processor is further configured to provide switching between the first communication service and the second communication service.

4. The electronic device of claim 1, wherein the processor is further configured to:

receive an RTP packet from an external device;

determine which one of the first communication service or the second communication service is associated with the RTP packet; and process the RTP packet based on the determination.

5. The electronic device of claim 1, wherein the processor is further configured to control a use of a codec in the first communication service or the second communication service.

6. The electronic device of claim 1, wherein the presence information is displayed on a screen of a contact application including contact information registered in the electronic device.

7. The electronic device of claim 6, wherein the processor is configured to:

receive a second user input for executing the contact application;

execute the contact application in response to receiving the second user input; and display the screen of the contact application on the display according to the execution of the contact application.

8. The electronic device of claim 6, wherein the screen of the contact application further includes one or more of a text, a symbol, and an image, indicating the presence information of the one or more counterpart devices.

9. The electronic device of claim 6, wherein the processor is configured to:

receive the presence information of the one or more counterpart devices; and store network addresses of the one or more counterpart devices included in the received presence information in a database of the contact application.

10. The electronic device of claim 1, wherein the presence information indicates whether the one or more counterpart devices are executing the first communication service provided through the browser application of the one or more counterpart devices.

11. The electronic device of claim 1, wherein the first communication service corresponds to a voice call, a video call, a video chat, a video conference, or a file transfer.

12. The electronic device of claim 1, wherein the screen of the browser application includes a first video photographed by the electronic device and a second video photographed by the one or more counterpart devices.

13. The electronic device of claim 1, wherein the screen of the browser application further includes the presence information of the one or more counterpart devices.

14. The electronic device of claim 1, wherein the processor is configured to:

receive a notification including the presence information of the one or more counterpart devices from a presence server; and display the presence information included in the received notification on the first screen of the browser application.

15. The electronic device of claim 1, wherein the processor is configured to transmit presence information of the electronic device associated with the first communication service to a presence server.

16. A method of providing a service by an electronic device, the method comprising:

displaying, on a display of the electronic device, a plurality of objects corresponding to a plurality of counterpart devices respectively, wherein each of the plurality of counterpart devices is associated with one or more of a first communication service provided through a browser application and a second communication service provided through an internet protocol (IP) multimedia subsystem (IMS);

displaying, on the display, one or more first icons indicating presence information of one or more counterpart devices among the plurality of counterpart devices, wherein the one or more counterpart devices are differentiated, by the one or more displayed first icons, from remaining one or more counterpart devices among the plurality of counterpart devices, and wherein the one or more counterpart devices are associated with the first communication service and the second communication service and the remaining one or more counterpart devices are associated with the second communication service;

receiving a first user input for selecting at least one counterpart device among the one or more counterpart devices associated with the first communication service and the second communication service;

in response to receiving the first user input, displaying, on the display, a screen of the browser application for providing the first communication service;

determining whether to use a second communication circuit configured to provide the second communication service based on a power consumption for providing the first communication service by a first communication circuit configured to provide the first communication service and the second communication circuit; and in response to determining to use the second communication circuit based on the second communication circuit consuming a smaller amount of power, providing the first communication service with the selected at least one counterpart device using the first communication circuit and the second communication circuit, wherein the first communication circuit and the second communication circuit provide overlapping communication functionality.

17. The method of claim 16, wherein the one or more first icons are displayed on a screen of a contact application including contact information registered in the electronic device.

18. The method of claim 17, further comprising:
receiving a second user input for executing the contact application;
executing the contact application in response to receiving the second user input; and
displaying the screen of the contact application according to the execution of the contact application.

19. The method of claim 17, wherein the screen of the contact application further includes one or more of a text, a symbol, and an image, indicating the presence information of the one or more counterpart devices.

20. The method of claim 17, further comprising:
receiving a notification including the presence information of the one or more counterpart devices; and
storing network addresses of the one or more counterpart devices included in the presence information included in the received notification in a database of the contact application.

21. The method of claim 16, wherein the presence information indicates whether the one or more counterpart devices are executing the first communication service provided through the browser application of the one or more counterpart devices.

22. The method of claim 16, wherein the first communication service includes a voice call, a video call, a video chat, a video conference, or file transfer.

23. The method of claim 16, wherein the screen of the browser application includes a first video photographed by the electronic device and a second video photographed by the one or more counterpart devices.

24. The method of claim 16, wherein the screen of the browser application includes the presence information of the one or more counterpart devices.

25. The method of claim 16, further comprising:
receiving a notification including the presence information of the one or more counterpart devices; and
displaying the presence information included in the received notification on the first screen of the browser application.

26. The method of claim 16, further comprising transmitting presence information of the electronic device associated with the first communication service to a presence server.

27. A non-transitory machine-readable storage medium recording a program for executing a method of providing a service by an electronic device, the method comprising:
displaying, on a display of the electronic device, a plurality of objects corresponding to a plurality of counterpart devices respectively, wherein each of the plurality of counterpart devices is associated with one or more of a first communication service provided through a browser application and a second communication service provided through an internet protocol (IP) multimedia subsystem (IMS);
displaying, on the display, one or more first icons indicating presence information of one or more counterpart devices among the plurality of counterpart devices, wherein the one or more counterpart devices are differentiated, by the one or more first icons, from remaining one or more counterpart devices among the plurality of counterpart devices, and wherein the one or more counterpart devices are associated with the first communication service and the second communication service and the remaining one or more counterpart devices are associated with the second communication service;
receiving a user input for selecting at least one counterpart device among the one or more counterpart devices associated with the first communication service and the second communication service;
in response to receiving the user input, displaying, on the display, a screen of the browser application for providing the first communication service;
determining whether to use a second communication circuit configured to provide the second communication service based on a power consumption for providing the first communication service by a first communication circuit configured to provide the first communication service and the second communication circuit; and
in response to determining to use the second communication circuit based on the second communication circuit consuming a smaller amount of power, providing the first communication service with the selected at least one counterpart device using the first communication circuit and the second communication circuit,
wherein the first communication circuit and the second communication circuit provide overlapping communication functionality.

* * * * *